(12) United States Patent
Chaddha et al.

(10) Patent No.: US 6,639,945 B2
(45) Date of Patent: Oct. 28, 2003

(54) METHOD AND APPARATUS FOR IMPLEMENTING MOTION DETECTION IN VIDEO COMPRESSION

(75) Inventors: Navin Chaddha, Sunnyvale, CA (US); Anoop Gupta, Menlo Park, CA (US); Albert Wang, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 09/759,408

(22) Filed: Jan. 12, 2001

(65) Prior Publication Data

US 2002/0106019 A1 Aug. 8, 2002

Related U.S. Application Data

(62) Division of application No. 08/818,805, filed on Mar. 14, 1997, now abandoned.

(51) Int. Cl.[7] .............................................. H04N 7/12
(52) U.S. Cl. ................................................ 375/240.23
(58) Field of Search ....................... 375/240.23, 240.02, 375/240.18, 240.24, 240.25, 240.29; 348/420.1, 393.1, 571, 577, 630; 302/246, 245, 248; 358/426.12, 426.13

(56) References Cited

U.S. PATENT DOCUMENTS

| 4,675,532 A | 6/1987 | Carson ........................ 250/578 |
| 4,718,087 A | 1/1988 | Papamichalis |
| 4,750,367 A | 6/1988 | Bernatets ..................... 73/602 |
| 4,827,533 A | 5/1989 | Tanaka ......................... 382/54 |
| 4,862,264 A | 8/1989 | Wells .......................... 348/416 |
| 4,899,149 A | 2/1990 | Kahan |
| 4,941,190 A | 7/1990 | Joyce ........................... 382/54 |
| 4,982,280 A | 1/1991 | Lyon et al. .................. 358/105 |
| 5,060,285 A | 10/1991 | Dixit et al. ................... 382/56 |

(List continued on next page.)

OTHER PUBLICATIONS

Nsour et al., "An improved ASIC design and implementation for color space conversion applications", IEEE 39th Midwest Symposium on Circuits and Systems, vol. 2, pp. 609–612, Aug. 1996.*

Moura, J.M., et al., "Retrieving Quality Video Across Hetergeneous Networks— Video Over Wireless", IEEE Personal Communications, 44–54, (Feb. 1996).

"Video Coding for Low Bitrate Communication", ITU–T, Draft H.263: Line Transmission of Non–Telephone Signals, Int'l Telecommunication Union, (May 2, 1996).

Primary Examiner—Vu Le
(74) Attorney, Agent, or Firm—Lee & Hayes, PLLC

(57) ABSTRACT

The present invention relates, in one aspect, to a method for processing video data that is divided into frames. The video data includes a current frame, which has an associated current macroblock, and an adjacent frame, which also has an associated macroblock. The method for processing video data involves obtaining an uncompressed current block that is a part of the current macroblock and an adjacent block that is part of the adjacent macroblock, and calculating a distance between the uncompressed current block and the adjacent block. It is determined whether the distance between the uncompressed current block and the adjacent block is acceptable. If the distance is unacceptable, then the current block is adoptively compressed.

32 Claims, 11 Drawing Sheets

U.S. PATENT DOCUMENTS

| | | | | |
|---|---|---|---|---|
| 5,091,925 A | | 2/1992 | Haendle et al. | 378/99 |
| 5,194,950 A | | 3/1993 | Murakami | 348/417 |
| 5,235,419 A | | 8/1993 | Krause | 348/416 |
| 5,247,589 A | * | 9/1993 | Faul et al. | 382/166 |
| 5,253,045 A | | 10/1993 | Lippel | 358/37 |
| 5,309,237 A | | 5/1994 | Singh | 348/607 |
| 5,325,092 A | | 6/1994 | Allen et al. | |
| 5,329,314 A | | 7/1994 | Correa et al. | 348/448 |
| 5,335,019 A | | 8/1994 | Herz et al. | 348/607 |
| 5,341,318 A | * | 8/1994 | Balkanski et al. | 708/402 |
| 5,349,383 A | | 9/1994 | Parke et al. | 348/397 |
| 5,351,047 A | | 9/1994 | Behlen | |
| 5,351,095 A | | 9/1994 | Kerdranvat | 348/699 |
| 5,396,497 A | | 3/1995 | Veltman | 370/100.1 |
| 5,414,469 A | | 5/1995 | Gonzales et al. | 348/408 |
| 5,453,801 A | | 9/1995 | Kim | 348/699 |
| 5,467,413 A | | 11/1995 | Barrett | 382/236 |
| 5,473,379 A | | 12/1995 | Horne | 348/416 |
| 5,481,543 A | | 1/1996 | Veltman | 370/94.1 |
| 5,502,492 A | | 3/1996 | Jung | 348/413 |
| 5,502,727 A | | 3/1996 | Catanzaro et al. | 370/94.2 |
| 5,510,834 A | | 4/1996 | Weiss et al. | 348/416 |
| 5,512,938 A | | 4/1996 | Ohno | 348/15 |
| 5,512,952 A | | 4/1996 | Iwamura | 348/416 |
| 5,521,918 A | | 5/1996 | Kim | 370/61 |
| 5,537,155 A | | 7/1996 | O'Connell et al. | 348/699 |
| 5,555,028 A | | 9/1996 | Kim | 348/607 |
| 5,557,341 A | | 9/1996 | Weiss et al. | 348/699 |
| 5,561,724 A | | 10/1996 | Kido et al. | 382/264 |
| 5,576,767 A | | 11/1996 | Lee et al. | 348/413 |
| 5,583,652 A | | 12/1996 | Ware | 386/75 |
| 5,592,231 A | | 1/1997 | Clatanoff et al. | 348/452 |
| 5,623,312 A | | 4/1997 | Yan et al. | 348/416 |
| 5,623,313 A | | 4/1997 | Naveen | 348/416 |
| 5,664,044 A | | 9/1997 | Ware | 386/75 |
| 5,731,840 A | | 3/1998 | Kikuchi et al. | 348/416 |
| 5,745,379 A | | 4/1998 | Lewis | 364/514 A |
| 5,764,307 A | | 6/1998 | Ozcelik et al. | 348/608 |
| 5,768,440 A | | 6/1998 | Campanelli et al. | 382/261 |
| 5,768,533 A | | 6/1998 | Ran | 395/200.77 |
| 5,768,535 A | | 6/1998 | Chaddha | 348/403 |
| 5,771,318 A | | 6/1998 | Fang et al. | 382/261 |
| 5,808,570 A | | 9/1998 | Bakhmutsky | |
| 5,812,702 A | | 9/1998 | Kundu | 382/260 |
| 5,832,134 A | | 11/1998 | Avinash et al. | 382/257 |
| 5,844,627 A | | 12/1998 | May et al. | 348/607 |
| 5,884,004 A | | 3/1999 | Sato et al. | 386/98 |
| 5,901,250 A | | 5/1999 | Ohara | |
| 6,031,937 A | * | 2/2000 | Graffagnino | 382/236 |
| 6,071,193 A | * | 6/2000 | Suzuoki | 463/31 |
| 2002/0006229 A1 | * | 1/2002 | Chao et al. | 382/240 |

* cited by examiner

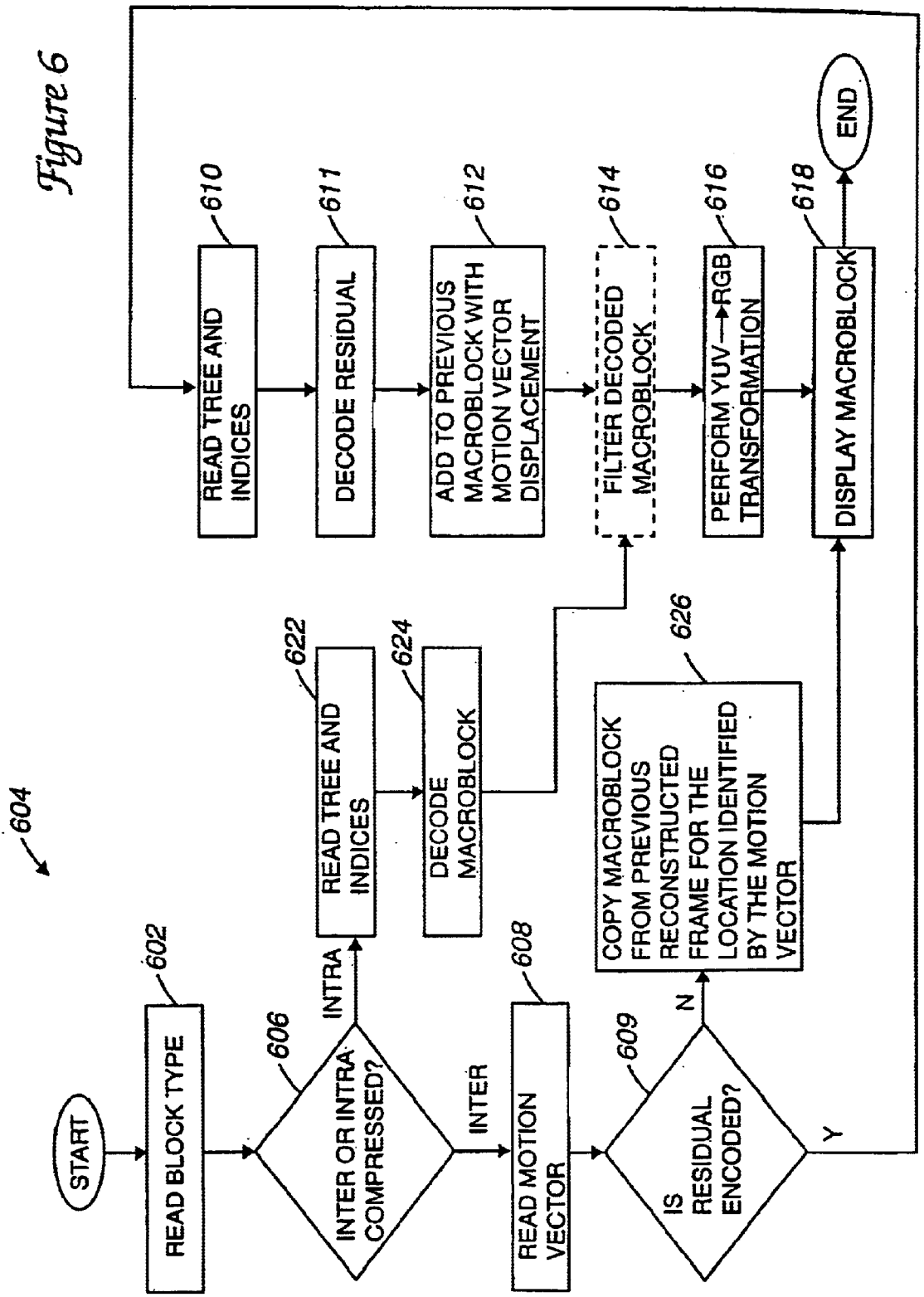

785

| INPUT | OUTPUT | FLUSH |
|---|---|---|
| 000 | a | 1 |
| 001 | a | 1 |
| 010 | a | 1 |
| 011 | a | 1 |
| 100 | b | 2 |
| 101 | b | 2 |
| 110 | goto 110 2nd stage table | 3 |
| 111 | goto 111 2nd stage table | 3 |

| INPUT | OUTPUT | FLUSH |
|---|---|---|
| 00 | c | 1 |
| 01 | c | 1 |
| 10 | d | 2 |
| 11 | e | 2 |

| INPUT | OUTPUT | FLUSH |
|---|---|---|
| 000 | f | 1 |
| 001 | f | 1 |
| 010 | f | 1 |
| 011 | f | 1 |
| 100 | g | 2 |
| 101 | g | 2 |
| 110 | h | 3 |
| 111 | i | 3 |

*Figure 7e*

METHOD AND APPARATUS FOR IMPLEMENTING MOTION DETECTION IN VIDEO COMPRESSION

CROSS REFERENCE TO RELATED APPLICATIONS

This application is a divisional of U.S. Ser. No. 08/818,805, filed Mar. 14, 1997, now abandoned.

This application is a divisional of U.S. patent application Ser. No. 08/818,805, filed Mar. 14, 1997, entitled "Method and Apparatus for Implementing Motion Detection in Video Compression".

This application is related to the following co-pending U.S. Patent Applications:

U.S. patent application Ser. No. 08/819,507 filed Mar. 14, 1997, entitled "Digital Video Signal Encoder and Encoding Method";

U.S. patent application Ser. No. 08/818,804 filed Mar. 14, 1997, entitled "Production of a Video Stream with Synchronized Annotations over a Computer Network";

U.S. patent application Ser. No. 08/819,586 filed Mar. 14, 1997, entitled "Methods and Apparatus for Implementing Control Functions in a Streamed Video Display System";

U.S. patent application Ser. No. 08/818,769 filed Mar. 14, 1997, entitled "Methods and Apparatus for Automatically Detecting Protocols in a Computer Network";

U.S. patent application Ser. No. 08/818,827 filed Mar. 14, 1997, entitled "Dynamic Bandwidth Selection for Efficient Transmission of Multimedia Streams in a Computer Network";

U.S. patent application Ser. No. 08/819,585 filed Mar. 14, 1997, entitled "Streaming and Displaying of a Video Stream with Synchronized Annotations over a Computer Network";

U.S. patent application Ser. No. 08/818,664 filed Mar. 14, 1997, entitled "Selective Retransmission for Efficient and Reliable Streaming of Multimedia Packets in a Computer Network";

U.S. patent application Ser. No. 08/819,579 filed Mar. 14, 1997, entitled "Method and Apparatus for Table-Based Compression with Embedded Coding";

U.S. patent application Ser. No. 08/819,587 filed Mar. 14, 1997, entitled "Method and Apparatus for Implementing Motion Estimation in Video Compression";

U.S. patent application Ser. No. 08/822,156 filed Mar. 17, 1997, entitled "Method and Apparatus for Communication Media Commands and Data Using the HTTP Protocol";

Provisional U.S. Patent Application Ser. No. 60/036,661 filed Jan. 30, 1997, entitled "VCR Control Functions";

Provisional U.S. patent Application Ser. No. 60/036,662 filed Jan. 30, 1997, entitled "Methods and Apparatus for Autodetecting Protocols in a Computer Network";

U.S. patent application Ser. No. 08/623,299, filed Mar. 28, 1996, entitled "Table-Based Compression with Embedded Coding";

U.S. patent application Ser. No. 08/625,650, filed Mar. 29, 1996, entitled "Table-Based Low-Level Image Classification System"; and U.S. patent application Ser. No. 08/714,447, filed Sep. 16, 1996, entitled "Multimedia Compression System with Additive Temporal Layers" which are all incorporated herein by reference in their entirety for all purposes.

BACKGROUND OF THE INVENTION

1. Field of Invention

The present invention relates to methods and apparatus for use in multimedia data processing. More particularly, the present invention relates to efficient methods and apparatus for encoding video data using a motion detection process, and decoding the encoded video data.

2. Background

As the use of computers, specifically computers which are linked across a network, increases, the demand for more immediate and complete interaction between a computer user and computers on the network is also increasing. One computer network which is increasingly being used is the Internet, the well-known international computer network that links various military, governmental, educational, nonprofit, industrial and financial institutions, commercial enterprises, and individuals. The Internet provides many multimedia services which are data intensive. Data intensive multimedia services include video services, as for example, multicast video services, on-demand video services such as interactive video services, all of which may be real-time services.

Storing, transmitting, and "playing" multimedia data, e.g., video data, consumes a significant portion of the resources of a computer system. The amount of space occupied by the data is dependent, at least in part, upon the particular characteristics of the data. By way of example, as the resolution and the frame rate requirements of a video increase, the amount of data that is necessary to "describe" the video also increases. Hence, data relating to the video consumes a greater amount of storage space.

One approach to reducing the amount of storage space required for video, or image, data involves compressing the data. The extent to which data is compressed is typically measured in terms of a compression ratio or a bit rate. The compression ratio is generally the number of bits of an input value divided by the number of bits in the representation of that input value in compressed code. It should be appreciated that higher compression ratios are typically preferred over lower compression ratios. The bit rate is the number of bits of compressed data required to properly represent a corresponding input value.

Interdependent compression techniques, which involve using characteristics of one frame in the process of encoding another frame, often involve the calculation of complicated transforms. Although interdependent compression techniques may be widely varied, interdependent compression techniques that are well-known to those skilled in the art include conditional replenishment techniques, as well as variations thereof.

Conditional replenishment is performed either directly on adjacent frames, or on blocks, i.e., contiguous subsets, of adjacent frames, one of which is typically considered to be a "current" frame. Conditional replenishment involves a determination of whether a block in the current frame should be encoded, based upon a comparison with a similarly positioned block in the selected adjacent, e.g., either "previous" or "subsequent," frame. In the event that the difference between the block in the current frame and the similarly positioned block in the selected adjacent frame is less than a specified value, rather than encoding the block in the current frame, the block in the current frame is replenished from the similarly positioned block in the selected adjacent frame.

Quantization methods may be used to convert a high-precision image description into a low-precision image description through a many-to-one mapping. After using techniques such as conditional replenishment to reduce temporal redundancy, techniques such as vector quantization are used to process images in blocks that are represented as vectors. Representative vectors are typically distributed in an n-dimensional space. When n is greater than one, as is well known in the art, there is no natural order to the representative vectors. As such, manipulating the indices to make the compression scaleable is often a complex task.

Further, vector quantization methods that are used to encode images are typically difficult to implement using software alone. While vector quantization methods are more easily implemented using a combination of hardware and software, the use of hardware for real-time vector quantization is impractical, as hardware is often not readily available.

Compression techniques also use colorspace conversions, or transformations, as is well known to those of skill in the art. Such colorspace conversions, which convert data from color space to luminance and chrominance space and vice versa, result in improved perceptual compression. Once colorspace conversions are made to compress data in luminance and chrominance space, in order to decompress the data, transformations must be made from luminance and chrominance space back to color space. Colorspace conversions from luminance and chrominance space to color space typically result in the loss of some color accuracy. In order to compensate for losses in color accuracy, noise is often added to decoded data, or data that has been reconverted into colorspace data. While adding noise to decoded data has been effective in neutralizing losses in color accuracy, the computing overhead associated with adding noise to decoded data is high. As such, compensating for losses in color accuracy often proves to be inefficient.

As complexity that is associated with compression and decompression techniques often reduces the efficiency with which data may be encoded and decoded, implementing compression and decompression techniques which are less complex, but still maintain an acceptable level of quality, are desirable. Further, implementing accurate and efficient motion detection methods which may be used to reduce the amount of data which is actually encoded and, therefore, decoded, is also desired. Specifically, in view of the foregoing, there are desired improved apparatus and methods for detecting motion such that video data may be efficiently compressed and decompressed.

SUMMARY OF THE INVENTION

The present invention relates, in one aspect, to a method for processing video data that is divided into frames. The video data includes a current frame, which has an uncompressed current block, and an adjacent frame, which has an adjacent block. The method for processing video data involves obtaining the current block and the adjacent block, and calculating a distance between the current block and the adjacent block. If the distance between the current block and the adjacent block is determined to be unacceptable, then the current block is compressed using adaptive compression.

In one embodiment, the method for processing video data further involves sending a header for motion detection that is arranged to indicate if the current block has been compressed. In such an embodiment, the header is used in conjunction with a binary tree or a quad tree to obtain compressed bits. In another embodiment, obtaining the current block involves segmenting the current frame.

In accordance with another aspect of the present invention, a method for performing a colorspace conversion on bits associated with video data involves obtaining bits which identify a codebook index for a component, and using the codebook index to obtain pixel representations for the component. The pixel representations are then dithered, and the dithered pixel representations are used to obtain an index for the component. In one embodiment, the dithered pixel representations are clipped.

In accordance with still another aspect of the present invention, a computer-implemented image processing system includes an encoder arranged to encode video data using adaptive compression techniques, and a decoder arranged to accept the encoded video data and to decode the encoded video data. The decoder includes a table-based N-stage Huffman decoder and a colorspace converter. In one embodiment, the colorspace converter is a table-based luminance and chrominance space to colorspace converter. In another embodiment, a network delivery system is arranged to channel the encoded video data from the encoder to the decoder.

BRIEF DESCRIPTION OF THE DRAWINGS

FIG. 2c is an enlarged representation of one of the smaller blocks of

FIG. 2b in accordance with an embodiment of the present invention.

FIG. 6 is a process flow diagram which illustrates the steps associated with decoding a block which was encoded using motion estimation in accordance with an embodiment of the present invention.

FIG. 7c is a diagrammatic representation of a first stage decoding table used with a two-stage Huffman decoder in accordance with an embodiment of the present invention.

FIG. 7d is a diagrammatic representation of one second stage decoding table used with a two-stage Huffman decoder in accordance with an embodiment of the present invention.

FIG. 7e is a diagrammatic representation of another second stage decoding table used with a two-stage Huffman decoder in accordance with an embodiment of the present invention.

DETAILED DESCRIPTION OF THE PREFERRED EMBODIMENTS

The present invention will now be described in detail with reference to a few preferred embodiments thereof as illustrated in the accompanying drawings.

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

While compression and decompression techniques, which are used to encode and decode data, respectively, are effective to reduce the amount of space utilized by the data on a computer system, conventional compression and decompression techniques are generally complex. Reducing the complexity associated with compression and decompression techniques, while maintaining an acceptable level of quality, increases the efficiency of the compression and decompression processes.

Complexity may be reduced in many different ways. By way of example, many processes used to encode and decode data involve the calculation of transforms and may, therefore, be simplified by reducing the number of transforms which are calculated. The complexity associated with encoding and decoding data may be reduced by implementing look-up tables and codebooks, in lieu of calculating transforms. The use of look-up tables and codebooks reduces the amount of processing overhead associated with calculating transforms, thereby increasing the overall efficiency of processes associated with encoding and decoding data, which include, but are not limited to, motion detection methods and colorspace transformations.

Figure 1A:
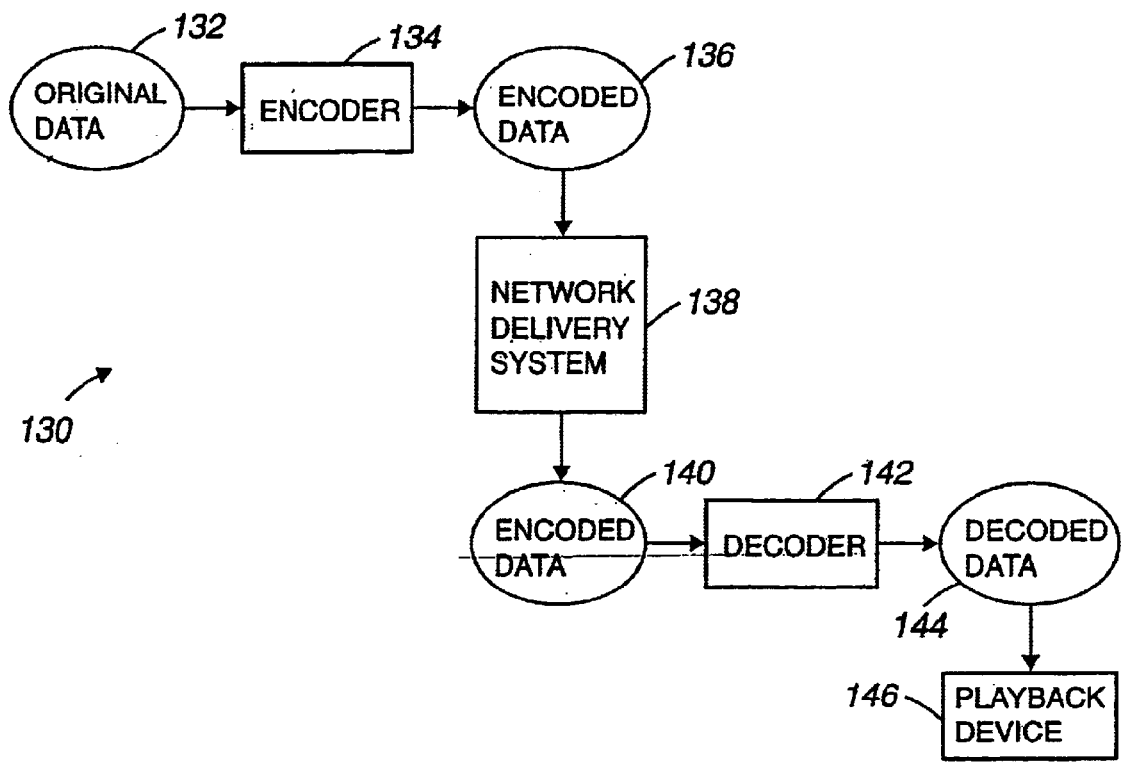
FIG. 1a is a diagrammatic representation of a data encoder and a data decoder, together with a network delivery system, in accordance with an embodiment of the present invention.

Referring initially to FIG. 1a, there is shown a data encoder and a data decoder, together with a network delivery system, in accordance with an embodiment of the present invention. "Original" data 132, or data which is generally unencoded, is input to an encoder 134 which encodes, or compresses, original data 132. Original data 132 is typically multimedia data, which includes, by way of example, audio data, video data, and still image data. Although any suitable compression method may be used to compress original data 132, methods which involve adaptive compression are preferred. One particularly suitable encoder which uses adaptive compression methods is described in U.S. patent application Ser. No. 08/623,299, filed Mar. 28, 1996, which is incorporated herein by reference for all purposes.

Encoded data 136, which is generated by encoder 134, is generally formatted for delivery over a network system. A network delivery system 138 accepts encoded data 136, and generates as output processed encoded data 140. Typically, network delivery system 138 is used to send encoded data 136 from one computer system on a network to another computer system on the network. It should be appreciated that network delivery system 138 typically includes channels over which encoded data 136 is transmitted.

Processed encoded data 140 is typically a formatted version of encoded data 136 which, as will be appreciated by those skilled in the art, is streamed. As processed encoded data 140 is streamed, processed encoded data 140 may therefore be used for video-conferencing and on-demand video applications, as well as various other applications.

A decoder 142 takes processed encoded data 140 as input, and generates decoded data 144 as output. While decoder 142 may utilize any suitable data decompression algorithm, one suitable decoder is described in above-referenced U.S. patent application Ser. No. 08/623,299. Once decoded data 144 is generated, decoded data 144 is forwarded to a playback device 146, which is generally associated with a computer system, that may be used to display or play decoded data 144. If original data 132 is still image data, playback device 146 serves to display the decoded still image. Alternatively, for embodiments in which original data 132 is either video data or audio data, playback device 146 plays the decoded video data or the decoded audio data, respectively.

Figure 1B:
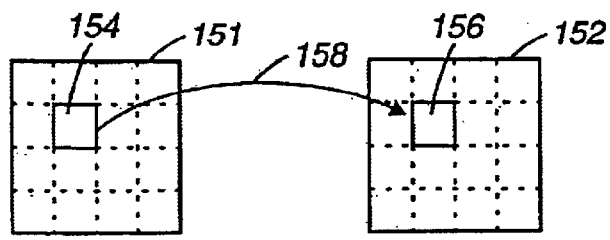
FIG. 1b is a diagrammatic representation of two consecutive video frames in accordance with an embodiment of the present invention.

The process of encoding data, or, more specifically video data, generally involves dividing video frames into blocks, and detecting motion between blocks in consecutive frames. FIG. 1b is a diagrammatic representation of two consecutive, or adjacent, video frames in accordance with an embodiment of the present invention. A first frame 151 is a reconstructed frame, or a frame which has previously been encoded and decoded, while a second frame 152 is an original frame, e.g., a frame that is potentially to be encoded. Although a frame may be of any suitable size, the size of a frame is typically limited by the capabilities of capture cards used to capture video. By way of example, one appropriate frame size is a frame size which is 320 pixels in width and 240 pixels in height, or 320×240.

First frame 151 and second frame 152 are each divided into "macroblocks," which may further be divided into blocks. The macroblocks, or blocks in general, like the frames, may also be of any suitable size. However, a block size in the range of approximately two pixels in width and two pixels in height (2×2) to sixteen pixels in width and sixteen pixels in height (16×16), as for example an 8×8 block, a 4×8 block, or a 4×4 block, is typically preferred. In the described embodiment, first frame 151 and second frame 152 are divided into 16×16 macroblocks, e.g., block 154 is a macroblock, which are then further divided into smaller blocks. It should be appreciated that a macroblock may be described as a large block. In general, a 16×16 or larger block is considered to be a macroblock, although any block which may be further divided may be referred to as a macroblock. A segmentation process, which may be used to determine specific block sizes, will be described below with respect to FIG. 2a.

Block 154 that is a part of first frame 151 is encoded, and in order to detect the motion between first frame 151 and second frame 152, a block 156 that is a part of second frame 152 is identified. In the described embodiment, block 156 of second frame 152 is in the same spatial location as block 154 of first frame 151. A motion vector 158 provides a measure of the distance between block 154 of first frame 151 and block 156 of second frame 152. Although any suitable method may be used to determine the distance between blocks, in one embodiment, the distance is measured by taking the pixel by pixel difference between block 154 of first frame 151 and block 156 of second frame 152 using a squared error comparison. This squared error comparison is then used to determine whether it is necessary to encode block 156 of second frame 152, as will be described below with respect to FIG. 3.

Figure 1C:
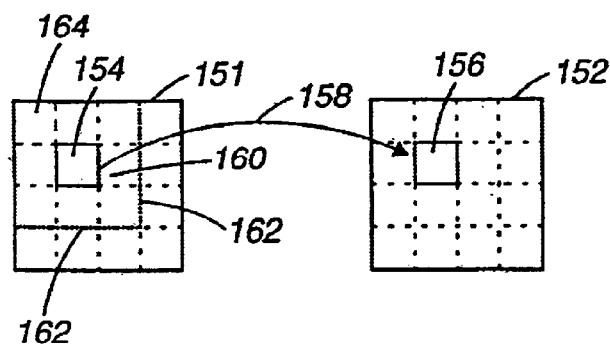
FIG. 1c is a diagrammatic representation of two consecutive video frames with a pixel search area in accordance with an embodiment of the present invention.

When the distance between block 156 of second frame 152 and block 154 of first frame 151 exceeds a certain threshold, motion estimation methods, as will be described below with respect to FIG. 5, may be used to identify a block in first frame 151 which best matches block 156 of second frame 152. With reference to FIG. 1c, the search for a block in first frame 151 which matches block 156 of second frame 152 will be described in accordance with an embodiment of the present invention. A search area 160, i.e., an area that is to be searched to locate a block that best matches block 156 of frame 152, is defined around block 154 of first frame 151.

Although search area 160 may be of any suitable size, in one embodiment, search area 160 is defined by edges 162 that are each offset. by twenty-four pixels from the origin, or center, of block 154 of frame 151. That is, the "centerpoints" of edges 162 are displaced from the center of block 154 by twenty-four pixels. In another embodiment, as blocks for which matches are sought are often smaller than 16×16 blocks, a search area may be defined by edges which are displaced from the center of the block by sixteen pixels.

It should be appreciated that for embodiments in which a search area is defined around a block which is on the periphery of a frame, e.g., block 164 of first frame 151, the search area is constrained at least in part by the boundaries of the frame. In other words, the search area preferably remains within the boundaries of the frame.

The size of a block in a frame can depend on many different factors. By way of example, if a section of a frame contains a detailed characteristic, it is typically desirable to divide that section of the frame into smaller blocks, as compared to blocks in other sections of the frame, such that the blocks may be encoded to generate an acceptable resolution for the characteristic. That is, each of the smaller blocks may be encoded with approximately the same number of bits as each of the larger blocks, i.e., the number of bits per pixel in the smaller blocks is higher than the number of bits per pixel in the larger blocks. In general, blocks are sized to provide the highest quality of resolution for a particular bit rate. The process of dividing a frame into blocks, and determining how many bits to allocate for each block in order to generate a high quality image for a particular bit rate, is known as segmentation.

Figure 2A:
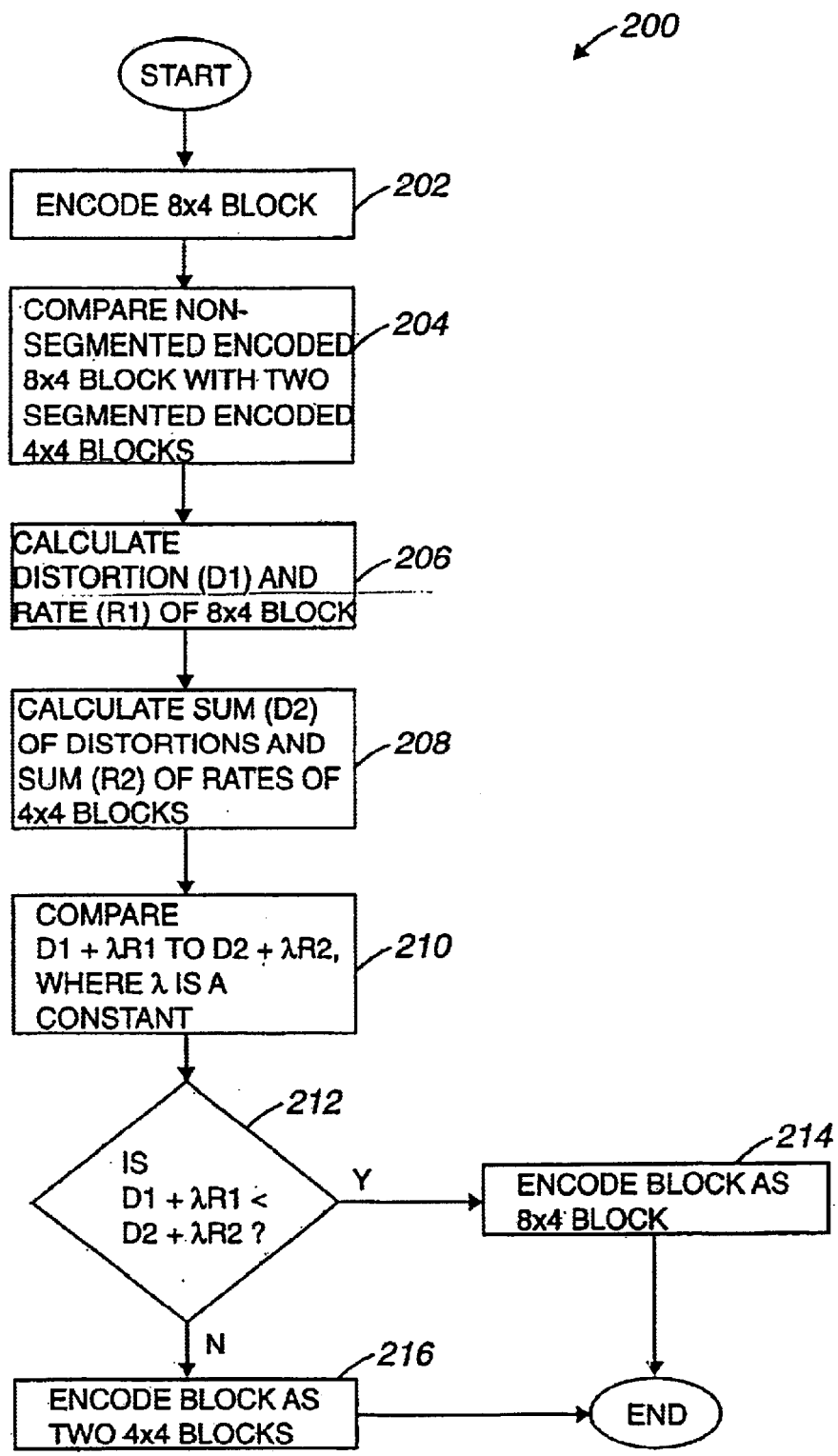
FIG. 2a is a process flow diagram which illustrates the steps associated with a segmentation process in accordance with an embodiment of the present invention.

FIG. 2a is a process flow diagram which illustrates the steps associated with a segmentation process in accordance with an embodiment of the present invention. It should be appreciated that the segmentation process is recursive. That is, blocks of many different sizes may be encoded during the segmentation process, before the block sizes that are to be used are chosen. By way of example, blocks may be encoded in different sizes for comparison purposes to determine if a "larger" block size is adequate, or whether "smaller" block sizes are needed to properly capture a portion of an image.

The segmentation process 200 begins at step 202 in which a portion of a frame is encoded as a block of a specific size. In the described embodiment, the block is a non-segmented 8×4 block, i.e., a block which is 8 pixels by 4 pixels in dimension. The block may be encoded using any suitable compression process, as for example the efficient adaptive compression process which uses a codebook which is described in above-referenced U.S. patent application Ser. No. 08/623,299.

The non-segmented encoded 8×4 block is compared with two segmented encoded 4×4 blocks in step 204. In one embodiment, the segmented encoded 4×4 blocks are encoded using a codebook. It should be appreciated that the two encoded 4×4 blocks are sub-blocks of the 8×4 block. In the described embodiment, it is assumed that the 4×4 blocks have been previously encoded, although in some embodiments, the 4×4 blocks are encoded as needed, e.g., the 4×4 blocks may be encoded as part of step 204.

In step 206, the distortion D1 and the rate R1 of the 8×4 block are calculated. Methods used to calculate distortion and rate may be widely varied, but are generally well-known. By way of example, in one embodiment, distortion may be determined using standard squared error calculations. As will be appreciated by those skilled in the art, the distortion of a block is generally an indicator of the overall quality degradation of the encoded block as compared to the original block, whereas the rate of a block is generally a measure of the number of bits that may be transmitted over a given channel for the block, and is limited by the characteristics of the channel over which the bits are to be transmitted. In the described embodiment, the rate of a block includes bits which represent an index for the block as well as bits which represent an "encoding map" tree, or a segmentation tree, which is a representation of a mapping that is used to encode the block. One embodiment of the encoding map tree will be described in more detail below with reference to FIGS. 2b through 2d.

After the distortion D1 and the rate R1 of the 8×4 block are calculated, the sum D2 of distortions and the sum R2 of rates of the 4×4 blocks are calculated in step 208. A constant Lambda $\lambda$ is defined and the quantities D1+$\lambda$R1 and D2+$\lambda$R2 are calculated and compared in step 210. The process of determining appropriate values for $\lambda$ which is a rate control parameter, is analogous to the process of determining a quality parameter as described in co-pending U.S. patent application Ser. No. 08/819,507 filed Mar. 14, 1997, entitled "Digital Video Signal Encoder and Encoding Method" filed concurrently herewith, which is incorporated herein by reference in its entirety for all purposes. In general, however, typical values for $\lambda$ are in the range of approximately 0 to 100 distortion units per bit, e.g., pixels squared per bit, where a value of 0 places a complete emphasis on distortion, and a value of 100 places more of an emphasis on rate.

From step 210, process control proceeds to step 212 in which a determination is made regarding whether the quantity D1+$\lambda$R1 is less than the quantity D2+$\lambda$R2. In general, minimizing the sum of distortion D and rate R, which is multiplied by $\lambda$, i.e., D+$\lambda$R, for a given value of $\lambda$ provides for the best quality of resolution for a particular bit rate.

If it is determined that the quantity D1+$\lambda$R1 is less than the quantity D2+$\lambda$R2, then the 8×4 block is acceptable, and the block is encoded as an 8×4 block in step 214. That is, the 8×4 block encoded in step 202 is used to represent a portion of a frame. Once the 8×4 block is encoded in step 214, the process of encoding a block is complete.

If the determination in step 212 is that the quantity D1+λR1 is greater than the quantity D2+λR2, then encoding the 8×4 block as a single 8×4 block is considered to be an inadequate representation of the block, and the 8×4 block is encoded as two 4×4 blocks in step 216. It should be appreciated that the two 4×4 blocks are segmented blocks. In the described embodiment, after the two 4×4 blocks are encoded, the process of encoding an 8×4 block is complete. In other embodiments, due to the recursive nature of the segmentation process, each 4×4 block may further be encoded as segmented 4×2 blocks, and comparisons can be made to determine whether the 4×4 block is acceptable, or whether the 4×2 blocks are necessary. While the smallest block sizes which are typically encoded are 2×2 blocks, it should be appreciated that the 4×4 block may also be encoded as 1×1 blocks.

Figure 2B:
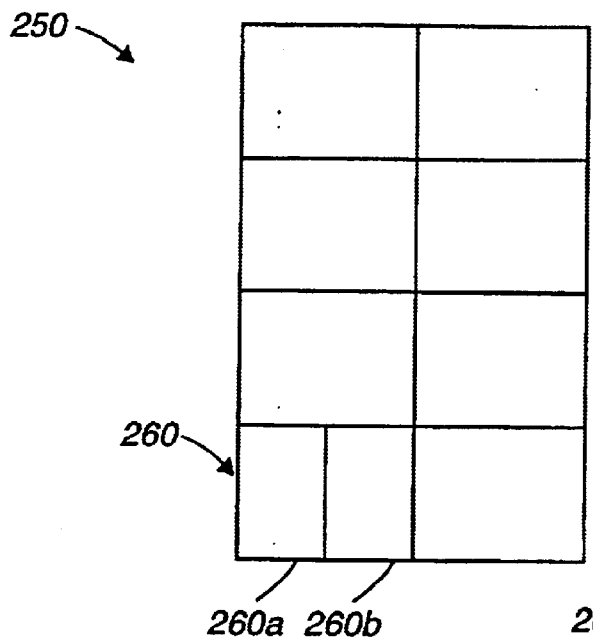
FIG. 2b is a diagrammatic representation of a block which is divided into smaller blocks in accordance with an embodiment of the present invention.

As previously mentioned, the rate of a block includes bits which are associated with an encoding map tree that is used to identify how a block is divided. An encoding map tree generally reflects the divisions of a particular block. FIG. 2b is a diagrammatic representation of a block which is divided into smaller blocks in accordance with an embodiment of the present invention. A block 250 which, in the described embodiment, is a 16×16 block, is divided into eight 8×4 blocks, as for example block 260. Block 260 is further divided into two 4×4 blocks 260a and 260b.

Figure 2C:
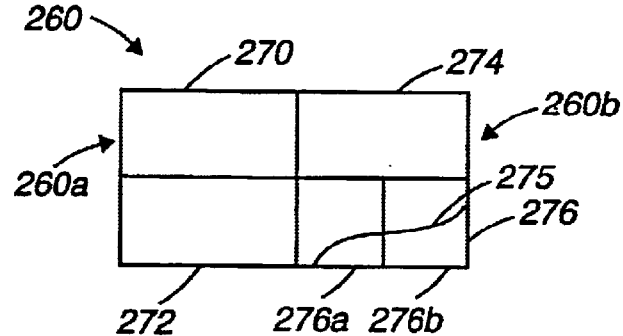

FIG. 2c is an enlarged representation of block 260 of FIG. 2b in accordance with an embodiment of the present invention. Block 260 includes a characteristic 275, or an edge, that represents a portion of an image that has a high amount of variation. As the resolution of the portion of block 260 that contains edge 275, i.e., 4×4 block 260b, requires more resolution than portions which have a relatively low amount of image variation, 4×4 block 260b may be divided into is smaller blocks. By way of example, 4×4 blocks 260a and 260b may be divided into 4×2 blocks 270, 272, 274, and 276. As shown, 4×2 block 276 may further be divided into 2×2 blocks 276a and 276b in order to properly capture edge 275.

Figure 2D:
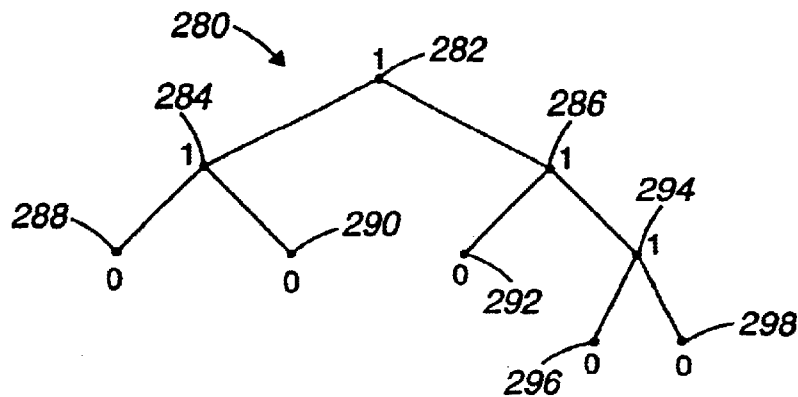
FIG. 2d is an encoding map tree in accordance with an embodiment of the present invention.

Referring next to FIG. 2d, an encoding map tree for block 260 (as shown in FIG. 2c) will be described in accordance with an embodiment of the present invention. A tree 280 has a root node 282 which represents 8×4 block 260 of FIG. 2c. Node 282, which is identified by a designation of one, branches off to nodes 284 and 286 which represent divisions of 8×4 block 260 into two 4×4 blocks (see FIG. 2c). It should be appreciated that designations of one indicate that a block is being further split into smaller blocks, while a designation of zero indicates that a block has been encoded. Such designations indicate that the encoding map tree, in the described embodiment, is a binary tree map. In other embodiments, the encoding map tree may be a quad tree map.

Node 284, which has a designation of one, is split into two nodes 288 and 290 which represent 4×2 blocks, e.g., blocks 270 and 272 of FIG. 2c. As nodes 288 and 290 each have a designation of zero, the blocks represented by nodes 288 and 290 are not further split, and the blocks, which are 4×2 blocks in the described embodiment, are encoded. As nodes 288 and 290 are not further split, nodes 288 and 290 may be considered to be terminal nodes, or "leaves."

Like node 284, node 286 also branches off into two nodes 292 and 294. Node 292 has a designation of zero and, hence, the block represented by node 292 (Block 274 of FIG. 2c) is encoded as a 4×2 block. On the other hand, node 294, which has a designation of one, is further split, i.e., the 4×2 block represented by node 294 is further split into 2×2 blocks. Nodes 296 and 298, which branch off from node 294, each have a designation of zero. As such, the blocks represented by nodes 296 and 298, e.g., 2×2 blocks 276a and 276b of FIG. 2c, are encoded and are not further split.

The rate of tree 280 is calculated from a parent node, or a node from which branches extend, as for example root node 282. As will be appreciated by those skilled in the art, through a traversal of tree 280 using a depth first search, the rate for tree 280 may be determined to be seven bits. The rate indicates that seven bits are needed to specify the encoding of the 8×4 block that is represented by tree 280.

Node 282 requires one bit which indicates that the 8×4 block (block 260 of FIG. 2c) is divided into two 4×4 blocks. One bit is required for each 4×4 block to indicate that the 4×4 blocks are to be divided into 4×2 blocks, as indicated at nodes 284 and 286. Two bits are required to indicate that the 4×2 block represented by node 284 is not to be split, while two bits are also required to indicate that the 4×2 block represented by node 294 is to be split into two 2×2 blocks. In the described embodiment, as 2×2 blocks are considered to be the smallest block size, i.e., blocks may not be split into 2×1 or 1×1 blocks, no bits are needed to represent that the 4×2 block represented by node 294 is encoded as two 2×2 blocks. Hence, the rate for tree 280 is seven bits.

Figure 3:
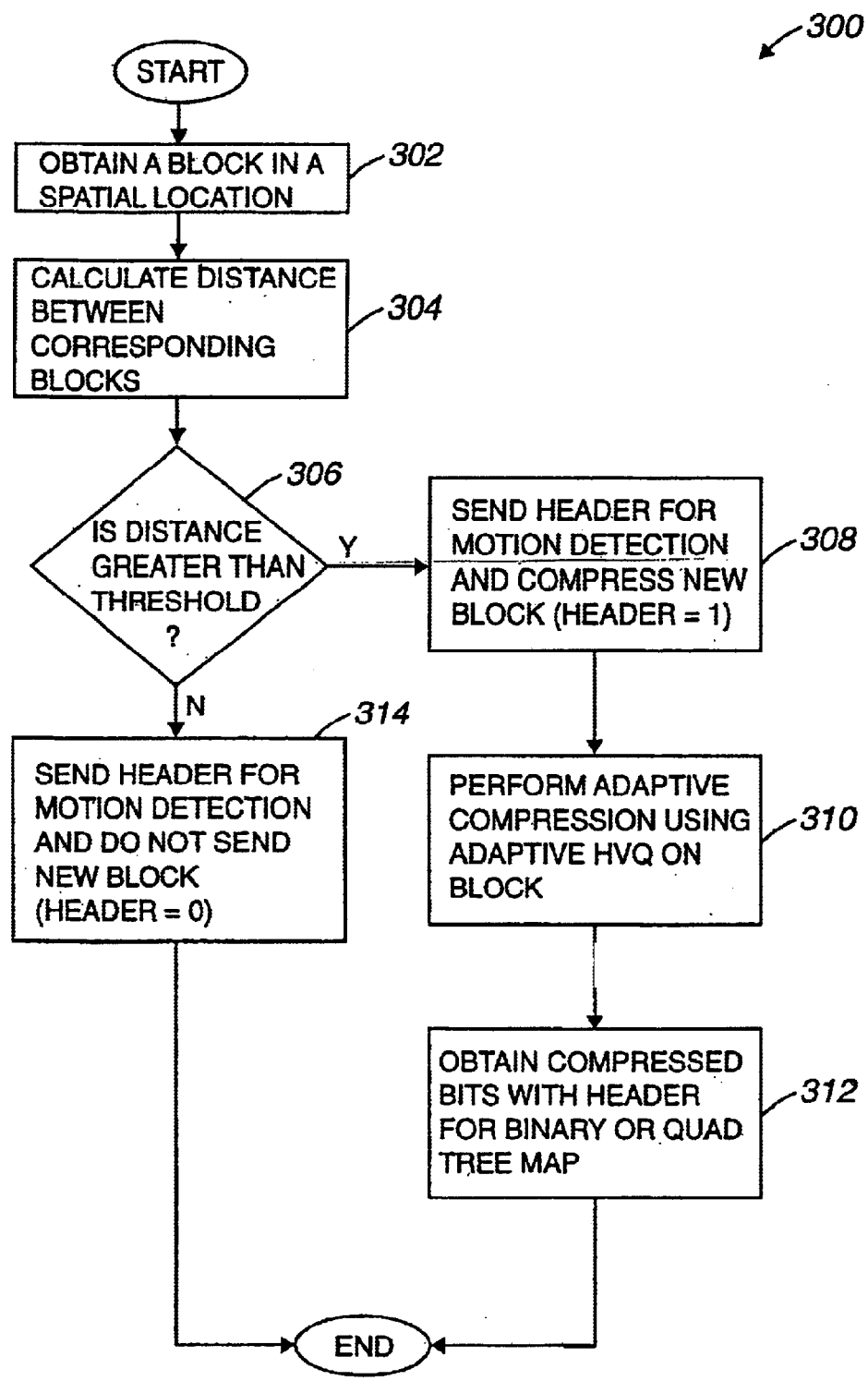
FIG. 3 is a process flow diagram which illustrates the steps associated with encoding a block based upon motion detection in accordance with an embodiment of the present invention.

With reference to FIG. 3, the process of encoding a block based upon motion detection will be described in accordance with an embodiment of the present invention. The process 300 begins at step 302 in which a block and a corresponding block, which are located in the same spatial location of two frames, are obtained. That is, the block located at a given spatial location is obtained from a "previous" reconstructed frame and a "new" original frame. Although the two frames are consecutive frames in most embodiments, it should be appreciated that the frames are not necessarily consecutive.

After the blocks are obtained, the distance between the corresponding blocks is calculated in step 304. Calculating the distance between corresponding blocks may involve calculating a pixel by pixel difference between blocks using a squared error comparison. One method for calculating the distance between corresponding blocks is described in above-referenced co-pending U.S. patent application Ser. No. 08/819,507.

Once the distance between corresponding blocks is calculated in step 304, a determination is made in step 306 regarding whether the calculated distance is greater than a specified threshold distance. If it is determined that the distance exceeds the threshold, then process flow proceeds to step 308 in which a header for motion detection is sent, e.g., transmitted over a channel, and a new block is compressed. The new block is compressed due to the fact that the distance between the previous block and the new block is such that the new block is substantially different from the previous block. The header for motion detection is set to indicate that a new block has been compressed. In the described embodiment, a header value of one is used to indicate that the new block has been compressed.

From the step of compressing the new block, process flow proceeds to step 310 in which adaptive compression is performed to compress the new block. In general, adaptive compression is efficiently performed using an adaptive Hierarchical Vector Quanfization (HVQ) process. One particularly suitable adaptive HVQ process, as previously mentioned, is described in above-referenced U.S. patent application Ser. No. 08/623,299. After adaptive compression is performed, the compressed bits are obtained with the header for a binary or quad tree map in step 312. Binary and quad tree maps are well known to those skilled in the art. Once the compressed bits are obtained, the process of encoding a block based upon motion detection ends.

If the determination in step 306 is that the distance between corresponding blocks is less than the specified threshold, then process control proceeds from step 306 to step 314 in which a header for motion detection is sent, but the new block is not sent. As the distance is not greater than a threshold, the new block is considered to be substantially the same as the previous block. Although any suitable header for motion detection may be used to signify that a new block has not been compressed, in the described embodiment, the header for motion detection is set to zero to signify that a new block has not been compressed and sent. After the header for motion detection is sent, the process of encoding a block based upon motion detection ends.

Figure 4:
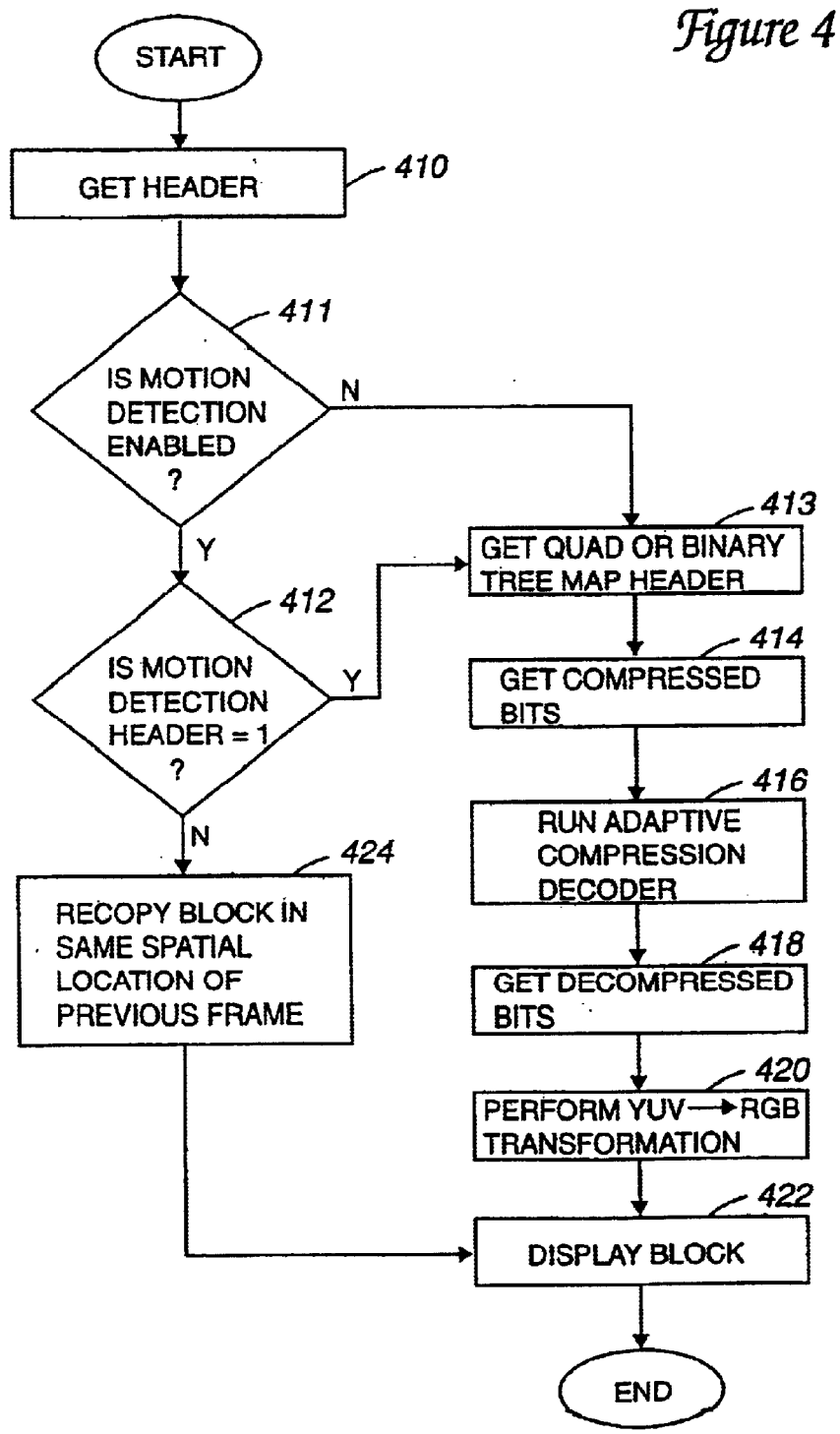
FIG. 4 is a process flow diagram which illustrates the steps associated with decoding a block which was encoded using motion detection in accordance with an embodiment of the present invention.

As described above with respect to FIG. 1a, encoded data, e.g., a block, is processed by a network delivery system which typically sends the encoded data to a computer system that decodes the encoded data. Referring next to FIG. 4, the process of decoding a block, which was encoded as a result of a motion detection process, will be described in accordance with an embodiment of the present invention. The process 400 begins at step 410 in which a header is obtained. The header, which is obtained for a frame, is arranged to indicate the frame type as to well as whether motion detection was enabled when the frame was encoded.

After the header is obtained, a determination is made in step 411 regarding whether the header indicates that motion detection was enabled. If it is determined that motion detection is not enabled, then the indication is typically that the frame is the first frame in a sequence of frames. In other words, the indication is that every block in that frame has been encoded. If motion detection is not enabled, process flow proceeds to step 413 in which the quad or binary tree map header is obtained for a block in the frame that is to be decoded.

After the quad or binary tree map header is obtained, the compressed bits corresponding to the block are obtained in step 414. Then, the compressed bits are run through an adaptive compression decoder in step 416. In general, while any suitable adaptive compression decoder may be used to decompress the block, one particularly suitable adaptive compression decoder is described in above-referenced U.S. patent application Ser. No. 08/623,299.

Once the adaptive compression decoder is run, then decompressed bits are obtained from the decoder in step 418. From step 418, process flow proceeds to step 420 where a transformation is made to convert the bits from YUV space to RGB space. One method which is used to transform the bits, encoded using a motion detection process, from YUV space to RGB space will be described in more detail below with respect to FIGS. 8a and 8b. After the transformation is made, the new block is displayed in step 422. Once the new block is displayed, the decoding process is completed.

Returning to step 411, if it is determined that motion detection is enabled, then process flow proceeds to step 412 in which a determination is made as to whether the motion detection header, which may be associated with the header obtained in step 410, is set to indicate that a block has been compressed. In the described embodiment, a motion detection header set to equal one is an indication that a block has been compressed. If it is determined that the block has been compressed, then process flow proceeds to step 413 in which a quad or binary tree map header is obtained.

If it is determined in step 412 that the motion detection header is not equal to one, e.g., that the motion detection header is equal to zero, then process flow proceeds to step 424 in which the previous block is recopied into the spatial location of the new frame that corresponds to the spatial location in which the previous block was copied in the previous frame. In other words, the previous block is copied into the current frame at the same spatial location at which the block was copied in the previous frame. Process control then proceeds to step 422 in which the block is displayed. After the block is displayed, the decoding process completed.

While motion detection methods are effective to compress blocks that are a part of video frames, motion estimation methods often further reduce the number of bits associated with a sequence of video blocks. Motion estimation techniques are particularly useful when a block in a previous frame which best matches the current block is not in the same spatial location as the current block.

Figure 5:
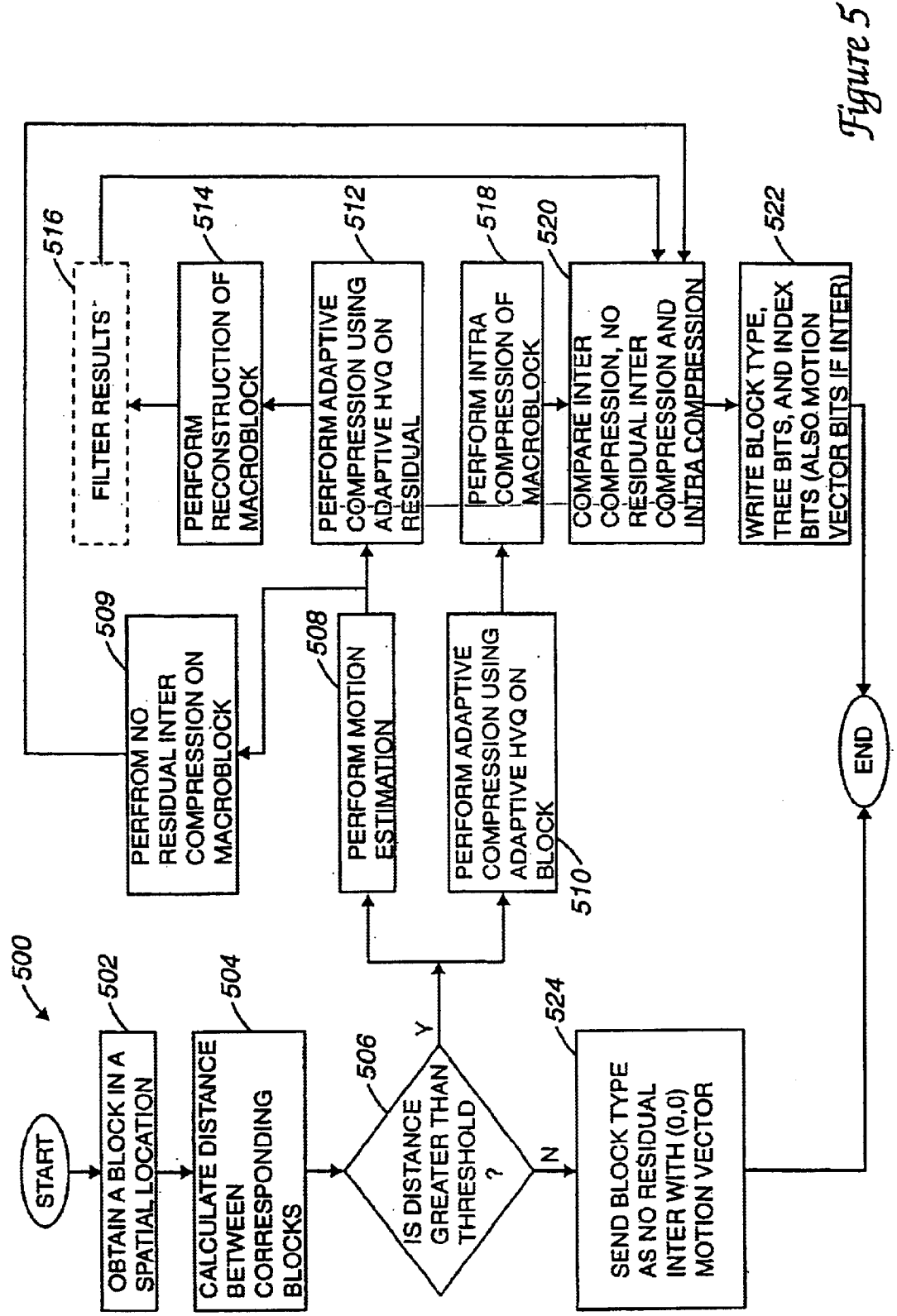
FIG. 5 is a process flow diagram which illustrates the steps associated with encoding a block using motion estimation in accordance with an embodiment of the present invention.

FIG. 5 is a process flow diagram which illustrates the steps associated with an encoding process that utilizes motion estimation in accordance with an embodiment of the present invention. The process 500 begins at step 502 in which a block is obtained in a spatial location of a previous reconstructed frame, and a corresponding block is obtained in the same spatial location of a current original frame. Although the two frames are consecutive frames in most embodiments, it should be appreciated that the frames are not necessarily consecutive.

After the blocks are obtained, the distance between the corresponding blocks is calculated in step 504. Calculating the distance between corresponding blocks may involve the calculation of a pixel by pixel difference between blocks through the use of a squared error comparison. One suitable method of calculating the distance between corresponding blocks, as previously mentioned with respect to FIG. 3, is described in above-referenced co-pending U.S. patent application Ser. No. 08/819,507.

A determination is made in step 506 regarding whether the distance between the corresponding blocks, as calculated in step 504, is greater than a specified threshold distance. If it is determined that the distance exceeds the threshold, then process flow branches to step 508, in which a motion estimation is performed. Process flow also branches from step 506 to step 510, in which adaptive compression is performed on the current block. It should be appreciated that while steps 508 and 510 are described as being performed "in parallel," steps 508 and 510 may also be performed sequentially.

Performing motion estimation in step 508 involves obtaining additional compression on a block by taking advantage of temporal redundancy in video, as will be appreciated by those skilled in the art. By way of example, when one block, e.g., a current block, is similar to a previous block, motion estimation may be used to perform an extra compression on the "difference" between the two blocks.

Motion estimation also generally involves searching every block within a certain range of a previous frame to find the block that, when compared to the corresponding block in the current frame, provides for the lowest squared error distortion. In other words, a search is made for the best block representation for the current frame. It should be appreciated that any block in the previous frame may be searched to find the best block representation. However, in the described embodiment, the search for the best block representation in the previous frame is made within a sixteen pixel displacement, as bounded by the edges of the previous frame, from the origin of the block in the previous frame that is in the same spatial location as the current block.

A motion vector, which gives the displacement from the best block representation in the previous frame to the current block, is calculated during motion estimation. It should be appreciated that if there is no movement from the best block representation to the current block, a motion vector which indicates that there is no movement is generated. Although any suitable method may be used to encode a motion vector, one method that is used to encode a motion vector is a Huffman coding technique, which is well known to those skilled in the art. Huffman coding is generally arranged to encode the most common symbols in order to substantially optimize the number of bits which are being sent. A description of Huffman coding may be found in *Vector Quantization and Signal Compression*, by Allen Gersho and Robert M. Gray (Kluwer Academic Publishers, 1992), which is incorporated herein by reference for all purposes.

Motion estimation further involves the calculation of a residual. A residual is the result of a pixel by pixel subtraction between the current block and the best block representation from the previous frame. After motion estimation is performed in step 508, process flow branches to step 509, in which an interdependent compression is performed on the current block, and to step 512, in which adaptive compression is performed on the residual, i.e., the residual is encoded. It should be appreciated that although steps 509 and 512 are described as being performed in parallel, steps 509 and 512 may also be performed sequentially.

As previously mentioned, one suitable adaptive compression encoder is an adaptive HVQ encoder. Such an encoder, as well as any other suitable encoder, may be used to encode the residual and, therefore, the macroblock which includes the current block, in step 512. The macroblock which includes the current block is generally compressed using an interdependent, or "inter," compression technique. An inter compression technique is dependent upon the previous macroblock, as well as on the current macroblock. After the current macroblock is encoded using inter compression, the macroblock which includes the current block is reconstructed in step 514, using any suitable method.

The reconstructed macroblock may be filtered in order to reduce noise in optional step 516. It should be appreciated that any suitable filter, as for example a median filter which is used to remove impulse noise, may be implemented. Such a median filter may involve removing impulse noise artifacts from a macroblock to determine median values, then replacing pixel values with the median values.

Returning to step 510, once adaptive compression, e.g., adaptive HVQ, is performed on the current block, then intradependent, or "intra," compression is performed on the macroblock which includes the current block in step 518. Intra compression involves encoding an original macroblock, and has no dependency on a previous macroblock.

Returning next to step 509, which is the step of performing an interdependent, or "inter," compression on the macroblock which includes the current block, the distance between the current block and the best block representation from the previous frame is determined. Step 509 also involves determining a motion vector which characterizes the distance between the current block and the best block representation from the previous frame. It should be appreciated that as step 509 does not involve coding a residual, step 509 may be considered to be the step of performing a no residual inter compression.

In step 520, the results of the "residual coded" inter compression performed in step 512, which may be filtered in optional step 516, are compared with the results of the intra compression performed in step 518 and with the results of the no residual inter compression. The comparison is used to determine whether the original macroblock is to be sent as an inter-coded macroblock or as an intracoded macroblock. In general, inter-coded macroblocks are used. However, in cases of high motion where many objects enter and exit a scene, e.g., a frame, intra-coded macroblocks may be used occasionally.

After the inter-coded macroblock is compared with the intra-coded macroblock and the no residual inter-coded macroblock, the macroblock with the smallest $D+\lambda R$ value is selected, and process flow proceeds to step 522 in which a block type is written to identify whether the macroblock, as encoded, is intercoded, no residual inter-coded, or intra-coded. Tree bits which identify how the macroblock is coded, e.g., encoding map tree bits, and index bits for adaptive indices, e.g., codeword indices, are also written. The indices are generally used in codebook look-ups to decode the encoded macroblock, as described in above-referenced U.S. patent application Ser. No. 08/623,299. In one embodiment, the indices are Huffman coded, i.e., encoded using a Huffman encoder, although any suitable method may be used to encode the indices.

If the macroblock has been encoded using inter compression, then motion vector bits, which are generally obtained through the use of a Huffman encoder, as mentioned above, are also written. It should be appreciated that motion detection bits which indicate if the macroblock has been encoded, are typically also written. After the bits are written in step 522, the process of encoding a macroblock is completed.

If the determination in step 506 is that the distance between the current block and the corresponding block in the previous frame does not exceed the acceptable threshold, then process control moves from step 506 to step 524 in which a block type is sent to indicate that the new block has been compressed using a no residual inter compression technique with a (0,0) motion vector. In other words, there has been no significant motion between the new, or current, block in the current frame and the corresponding previous block in the previous frame. As the distance is not greater than the threshold, the new block is considered to be substantially the same as the previous block and, in the described embodiment, the motion vector is set to zero. After the block type is sent, the encoding process ends.

Referring next to FIG. 6, the process of decoding a block which was encoded using motion estimation, as described above with respect to FIG. 5, will be described in accordance with an embodiment of the present invention. The process 600 begins at step 602 in which the block type is read. As previously mentioned, the block type are arranged to indicate whether and how the macroblock associated with the block type is encoded.

Step 606 is the determination of whether a current macroblock was compressed, or encoded, using inter compression, no residual inter compression, or intra compression. The determination generally involves reading the block type that was written to identify whether a block was encoded using some form of inter-coding or intra-coding, as described above with respect to FIG. 5.

If the determination in step 606 is that the current macroblock has been compressed using inter compression, then process flow proceeds to step 608 in which the motion vector bits are read. In step 609, a determination is made regarding whether a residual for the current macroblock is encoded. If it is determined that a residual for the current macroblock is encoded, then in step 610, encoding map tree bits and indices are read. The residual is decoded in step 611 using the indices, or codeword indices, to facilitate codebook look-ups as mentioned above. It should be appreciated that the current macroblock was encoded using "residual" inter compression, as such, the residual is typically decoded.

After the residual is decoded, the residual is added to a previous, reconstructed macroblock with the displacement specified by the motion vector in step 612. The motion vector and the codeword indices are generally decoded using Huffman decoders which will be described below with respect to FIGS. 7a through 7e.

From step 612, process flow moves to optional step 614 where the decoded macroblock is filtered to reduce noise using any suitable filtering method. Process control then proceeds to step 616 in which a colorspace conversion is performed on the decoded macroblock. In order to save space, color images are typically compressed as a superposition of luminance and chrominance images. As such, the images in luminance and chrominance space are preferably transformed back into images in RGB space. One method for performing a luminance and chrominance space to color space transformation for bits encoded using a motion estimation technique will be described below with respect to FIG. 9.

After the luminance and chrominance space to colorspace conversion is performed, the macroblock is displayed on a screen which is generally associated with the computer system which was used to decode the macroblock in step 618. Then, the process of decoding a macroblock which was encoded using motion estimation is completed.

If it is determined in step 606 that the macroblock was compressed using intra compression, then process flow moves from step 606 to step 622 in which the encoding map tree and the indices are read. The encoding map tree and the indices are used to decode the macroblock in step 624. Once the macroblock is decoded, process flow proceeds to optional step 614 in which the decoded macroblock may be filtered.

If the determination in step 609 is that a residual for the current macroblock has not been encoded, then the corresponding macroblock from the previous reconstructed frame is copied into the location identified by the motion vector in the current frame in step 626. It should be appreciated that in the described embodiment, the copied macroblock is already decoded, and has already been transformed from luminance and chrominance space to RGB space. After the macroblock from the previous frame has been copied into the current frame, the macroblock is displayed as part of the current macroblock in step 618. Huffman coding, as previously mentioned, is often used to encode motion vectors, as well as indices. Huffman coding serves to reduce the number of bits in compressed data without incurring additional losses. Typically, with Huffman coding "symbols," e.g., characters or values, that are most likely to appear in data are encoded with fewer bits than symbols which are less likely to appear. In general, a Huffman encoder uses look-up tables to map input symbols to bits, as is well known to those skilled in the art. Once a Huffman encoder is used to compress bits, a Huffman decoder is typically used to decompress the compressed bits.

Figure 7A:
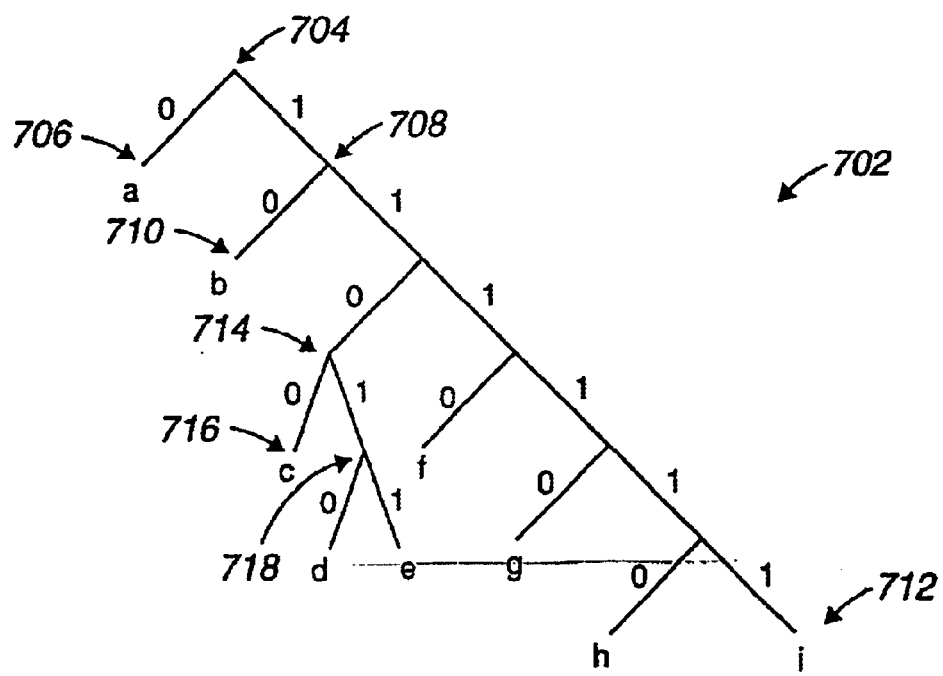
FIG. 7a is a tree representation of a classic Huffman decoder.
Figure 7B:
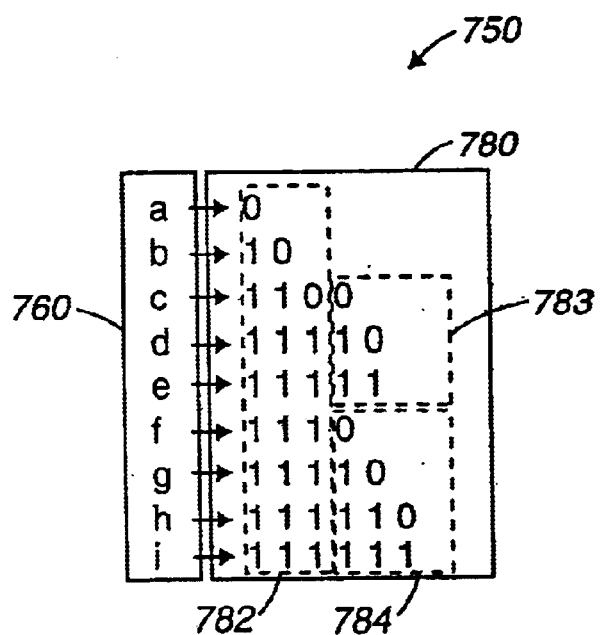
FIG. 7b is a diagrammatic representation of a table used with a two-stage Huffman decoder in accordance with an embodiment of the present invention.

With reference to FIG. 7a, a classic state-based Huffman decoder will be described. A binary mapping tree 702 is used to map bits to an appropriate symbol, and includes a root 704 which, as shown, may be associated either with a "0" bit or a "1" bit. If the first bit that is to be decoded is read in as "0," then the bits are mapped to leaf 706 which, as shown, corresponds to the "a" symbol. As such, bit "0" is decoded as the "a" symbol.

If the first bit that is to be decoded is read in as "1," then the next bit to be decoded is obtained, and tree 702 is traced from root 704 to node 708. If the next, or second, bit is "0," then the bits are mapped to leaf 710 which corresponds to the "b" symbol. More bits are obtained until either an intermediate leaf is reached, e.g., leaf 710, or the last leaf in tree 702 is read in. As shown, the last leaf in tree 702 is leaf 712.

As the state-based Huffman decoder, as shown, involves prefix-free codes, as will be appreciated by those skilled in the art, bits of "0" are not necessarily associated with leaves. For example, a bit of "0" may occur at a node, as for example node 714 which branches to leaf 716 and node 718. Once a leaf is reached, the bits are decoded, and the next bit that is to be obtained corresponds to root 704. That is, the decoding process begins again at root 704 of tree 702.

A table-based single-stage Huffman decoder is useful when there are few bits to be decoded, as the single-stage Huffman is faster than the classic Huffman decoder, and does not require significantly more resources than the classic Huffman decoder. However, when there are more than approximately ten bits to be decoded, both the classic Huffman decoder and the single-stage Huffman decoder are somewhat inefficient, and an efficient table-based N-stage Huffman decoder, where N is generally greater than or equal to two, may be implemented.

Referring next to FIGS. 7b through 7e, a two-stage Huffman decoder will be described in accordance with an embodiment of the present invention. It should be appreciated that the two-stage Huffman decoder is an illustrative example of a general N-stage Huffman decoder which may be used to decode a variety of data encoded using Huffman coding techniques. Such data, as previously mentioned, includes, but is not limited to, motion vectors. In two-stage Huffman decoder table 750, symbols 760 are mapped to bit representations 780. In a two-stage Huffman decoder, any bits which are read into the decoder are generally decoded in two groups. The size of the two groups may be determined by the maximum number of bits associated with a symbol. The process of decoding the first group essentially uses a single-stage Huffman decoder.

Bit representations 780 are divided into a first stage table 782 and two second stage tables 783 and 784. Second stage table 783, which is associated with first stage bits of "110," and second stage table 784, which is associated with first stage bits "111," will be referenced as "110" second stage table 783 and "111" second stage table 784 for clarity.

As shown, symbol "a" corresponds to a bit representation of "0," which is a single bit, while symbol "i" corresponds to a bit representation of "111111," which is six bits. In the described embodiment, it may be assumed that symbol "a" is more likely to occur than symbol "i," as symbol "a" is represented with the fewest number of bits, while symbol "i" is represented with the maximum number of bits.

For the two-stage Huffman decoder of the described embodiment, three consecutive bits are initially obtained for decoding. The three bits are decoded from first stage 782 of bit representations 780 in table 750. A first stage decoding table, as shown in FIG. 7c, may be used in the process of decoding first stage 782. For example, if the three bits of a bit stream are "000," "001," "010," or "011," then first stage 782, shows that the only symbol which has a "0" as a first bit is symbol "a." As such, the first "0" bit is decoded as symbol "a," then the first bit is flushed from the bit stream, as indicated by first stage decoding table 785 of FIG. 7c. After the first bit is decoded and flushed, the remainder of the bit stream is decoded.

If, for example, the three bits are "100" or "101," then since there is no symbol 760 that is mapped to a bit representation 780 of "1," the first two bits are decoded as symbol "b." After symbol "b" is decoded, the first two bits are flushed, as indicated by first stage decoding table 785 of FIG. 7c. It should be appreciated that the process of decoding bits associated with symbols "a" and "b," in the described embodiment, is essentially a single-stage Huffman process.

If the three bits which are obtained are "110," then, according to table 785 of FIG. 7c, the three bits are not decoded. The three bits are not decoded because there is no unique symbol 760 to which the three bits may be mapped. As such, the three bits are flushed from the bit stream, and in the described embodiment, the next two bits are obtained in "110" second stage table 783. Then, a corresponding second stage decoding table, e.g., a "110" second stage decoding table 787 as shown in FIG. 7d, is used to decode "110" second stage table 783.

If the two bits obtained in "110" second stage table 783 are "00" or "01," then, as indicated in "110" second stage decoding table 787 of FIG. 7d, the bits are decoded as symbol "c," and one bit is flushed. Alternatively, if the bits obtained in "110" second stage table 783 are "10" or "11" then the bits are decoded as symbols "d" and "e," respectively, and both bits are flushed.

When the three bits obtained in first stage table 782 are "111," then, as was is the case for bits "110," there is no unique symbol 760 to which the three bits may be mapped. As such, the three bits are flushed from the bit stream, as indicated in first stage decoding table 785 of FIG. 7c, and in the described embodiment, "111" second stage table 784 of bit representations 780 is obtained. As shown, while "110" second stage table 783 includes bit representations of two bits, "111" second stage table 784 includes bit representations of three bits.

If the three bits obtained in "111" second stage table 784 are "000," "001," "010," or "011," then, as indicated in "111" second stage decoding table 789 of FIG. 7e, the bits are decoded as symbol "f," and one bit is flushed. Alternatively, if the bits obtained in "111" second stage table 784 are "100" or "101," then the bits are decoded as symbol "g," and two bits are flushed. Finally, if the bits obtained in "111" second stage table 784 are "110" or "111," then the bits are decoded as symbols "h" and "i," respectively, and all three bits are flushed.

Decoding a bit stream using an N-stage Huffman decoder allows for efficient decoding, as bits are obtained in groups, rather than individually. In other words, the ability to decode a group of bits at one time using a look-up table generally reduces the processing time associated with decoding a bit stream in a bit-by-bit manner. The number of stages in an N-stage Huffman decoder may be widely varied, depending upon the requirements of a particular decoder. By way of example, for bit representations which include a large number of bits, e.g., approximately twenty bits, more than two stages may be implemented to take full advantage of the efficiency benefits of an N-stage Huffman decoder.

Further, the number of different tables required in a stage may be widely varied, but is generally determined by the prefixes used in bit representations. By way of example, in the described embodiment, a prefix is defined as a three bit combination. As such, there are only two prefixes, the "110" prefix and the "111" prefix, which are each common to more than one bit representation 780. As such, only two second stage tables 783 and 784 are needed to uniquely decode a bit stream that is associated with table 750. However, if other prefixes were associated with more than one bit representation, additional second stage tables may be required to uniquely map symbols to bit representations. Alternatively, if only one prefix is associated with bit representations, then only a single second stage table may be required.

Figure 8A:
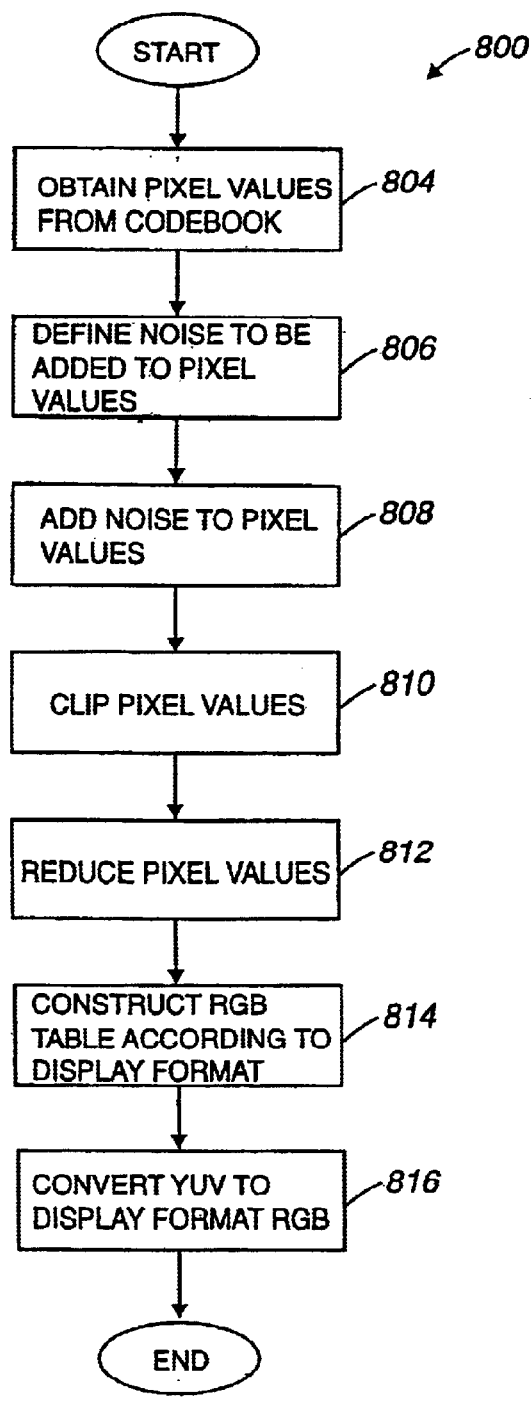
FIG. 8a is a process flow diagram which illustrates the steps associated with preprocessing a codebook that is used with a color transformation on bits encoded using motion detection in accordance with an embodiment of the present invention.

FIG. 8a is a process flow diagram which illustrates the steps associated with preprocessing a codebook for color transformations on bits encoded using motion detection in accordance with an embodiment of the present invention. As mentioned above with respect to FIG. 4, color transformations are generally used to transform bits from YUV space, or domain, to RGB space. The process 800 begins, and in step 804, pixel values are obtained from a codebook. In the described embodiment, the pixel values are obtained for luminance and chrominance components, e.g., a Y-component, a U-component, or a V-component. It should be appreciated that the pixel values may be obtained using indices obtained from bit streams for the luminance and chrominance components.

It should be appreciated that the pixel values are generally integers. For some components, as for example Y-components, the integers may be unsigned, e.g., the integers range from 0 to 255. For other components, as for example U-components and V-components, the integers may be signed, e.g., the integers range from –128 to +127.

In step 806, noise, which is to be added to pixel values to account for losses in color accuracy which typically occur during colorspace conversions, is defined. Then, in step 808, the noise is added to the pixel values. Adding noise to pixel values typically entails dithering the pixel values. That is, noise is added to pixel values such that the average value of the entity that is being represented by the pixel values is the average of all of the pixel values.

By dithering the pixel values prior to decoding luminance and chrominance data, as opposed to dithering decoded data, i.e., data which has been converted to RGB, or color space, the speed at which a colorspace conversion is performed may be increased. When pixel values are dithered prior to a colorspace conversion, most of the computation associated with dithering may be performed within a codebook. As such, there is essentially no computing overhead involved with the dithering process.

The addition of noise to the pixel values often results in an overflow of the pixel values. By way of example, for pixel values associated with Y-components, the addition of noise to the pixel values may result in a new pixel value that is over 255. In order to eliminate the overflow, the pixel values are clipped in step 810 to ensure that the pixel values fall within an acceptable range.

After the pixel values are clipped, the pixel values are reduced in step 812. "Reducing" pixel values, in general, involves modifying the pixel values such that they may be represented using six bits, which are usually the six highest order bits, or any other suitable number of bits. Although any appropriate method may be used to reduce pixel values, in the described embodiment, reducing pixel values involves first rounding the clipped pixel values, then dividing the rounded value by four. In another embodiment, reducing pixel values may entail first dividing the clipped pixel values by four, then rounding the divided value.

From step 812, process flow proceeds to step 814 in which an RGB table is constructed in accordance with a display format. That is, parameters associated with the display on which frames are to be displayed define, at least in part, the manner in which the RGB table is constructed.

After the RGB table is constructed, process flow moves to step 816 in which the reduced pixel values that correspond to luminance and chrominance components are converted into display format RGB space. In other words, Y, U, and V components are converted into the proper RGB format for display on a given display mechanism. It should be appreciated that the steps of constructing an RGB table and converting luminance and chrominance components into a display format, in one embodiment, are essentially the same step. Once the luminance and chrominance components are converted, the process of preprocessing a codebook ends.

Figure 8B:
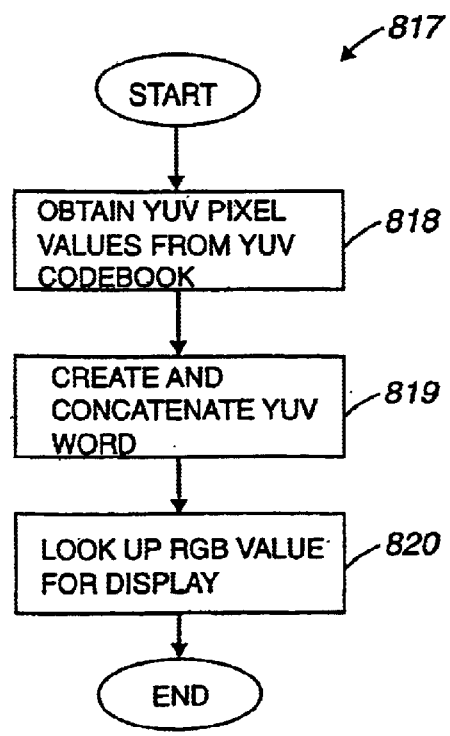
FIG. 8b is a process flow diagram which illustrates the steps associated with performing a color transformation on bits encoded using motion detection in accordance with an embodiment of the present invention.

Referring next to FIG. 8b, a process of performing a color transformation on bits encoded using motion detection will be described in accordance with an embodiment of the present invention. It should be appreciated that although the process will be described in terms of color transformations from YUV space to color space, color transformations may also be performed from other types of luminance and chrominance space to RGB space.

The process 817 begins and in step 818, YUV pixel values are obtained from a YUV codebook. In other words, a preprocessed Y pixel value, a preprocessed U pixel value, and a preprocessed V pixel value are obtained from a codebook. Once the pixel values are obtained, the pixel values are concatenated to form a YUV word in step 819. As the Y, U, and V pixel values have been processed within the codebook, the concatenated YUV word will not exhibit overflow. The YUV word is used, in step 820, to look up a corresponding RGB value for display. This RGB value may be obtained from the RGB table that was created as a part of the codebook preprocessing that was previously mentioned with respect to FIG. 8a. Once the RGB value is obtained, the process of performing a color transformation is completed.

Figure 9:
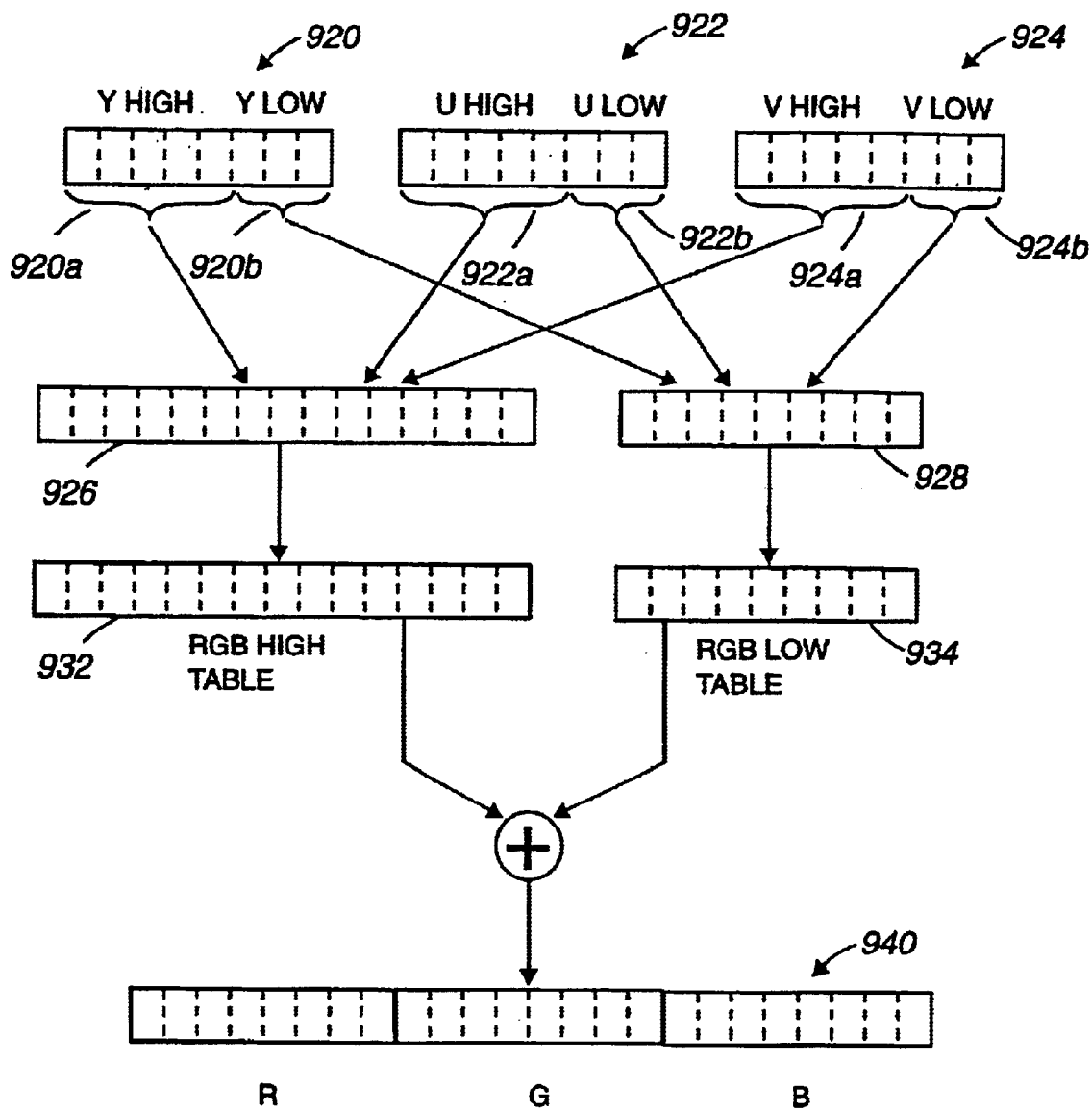
FIG. 9 is a diagrammatic representation of a color transformation performed on bits encoded using motion estimation in accordance with an embodiment of the present invention.

With respect to FIG. 9, the transformation of luminance and chrominance components encoded as a part of a motion estimation, or inter-coding, process into colorspace components will be described in accordance with an embodiment of the present invention. A Y-component 920, a U-component 922, and a V-component 924 are partitioned into higher order and lower order bits. As will be appreciated by those skilled in the art, colorspace transformations are typically linear. Hence, it is possible to partition luminance and chrominance components, e.g., Y-component 920, into higher order and lower order bits. Partitioning maintains the precision of the conversion while reducing the table size.

As shown, Y-component 920 is partitioned into five higher order bits 920a and three lower order bits 920b. However, it should be appreciated that Y-component 920 may be partitioned into any suitable combination of higher is order bits 920a and lower order bits 920b. By way of example, partitions of six higher order bits 920a and two lower order bits 920b, as well as partitions of four higher order bits 920a and four lower order bits 920b may be suitable. More even partitions will reduce the overall size of a lookup table associated with the bits. However, the reduction in the size of the table often compromises the accuracy of a colorspace transformation. Similarly, U-component 922 is partitioned into higher order bits 922a and lower order bits 922b, and V-component 924 is partitioned into higher order bits 924a and lower order bits 924b. The number of higher order bits and lower order bits is the same for Y-component 920, U-component 922, and V-component 924.

Once the components are partitioned into higher order and lower order bits, the higher order bits and the lower order bits are separately transformed into RGB space and saved into a lookup table. As many standardized transformation matrices are available, it should be appreciated that the actual values used in the colorspace transformations may be widely varied.

Once transformed, transformed versions of higher order bits 920a, 922a, and 924a for Y-component 920, U-component 922, and V-component 924, respectively, are arranged in a high order RGB table 932. Similarly, transformed versions of lower order bits 920b, 922b, and 924b for Y-component 920, U-component 922, and V-component 924, respectively, are arranged in a low order RGB table 934. It should be appreciated that higher order bits 920a, 922a, 924a may first be concatenated into a high YUV word 926. Similarly, lower order bits 920b, 922b, 924b may first be concatenated into a low YUV word 928.

The number of bits in high order RGB table 932 and low order RGB table 934 is dependent upon the number of higher order bits 920a, 922a, and 924a, as well as the number of lower order bits 920b, 922b, and 924b, respectively. Hence, in the described embodiment, high order RGB table 932 includes fifteen bits, and low order RGB table 934 includes nine bits.

The bits in high order RGB table 932 are clipped so that when the bits in high order RGB table 932 are eventually added to the bits in low order RGB table 934, an overflow of bits is avoided. The bits in low order RGB table 934 are examined to identify the largest value which may be generated from low order RGB table 934. This largest value is then clipped from high order RGB table 932. It should be appreciated that although U-component 922 and V-component 924 are typically signed, underflow problems do not occur because partitioning a signed 2's component number leaves the upper partition signed and the lower partition unsigned.

This process of transforming to RGB and clipping is repeated for substantially all possible combinations of the high order bits of YIN to construct RGB high table 932, and substantially all possible combinations of the low order bits are used to construct RGB low table 934.

When a color transformation on bits encoded using a motion estimation process is desired, in the described embodiment, YUV pixel values may be obtained from a YUV codebook. The YUV pixel values obtained from the codebook may then be partitioned into high bits 920a, 922a, 924a and low bits 920b, 922b, 924b. High YUV word 926 is constructed by concatenating high bits 920a, 922a, 924a, and low YUV word is constructed by concatenating low bits 920b, 922b, 924b. High YUV word 926 and low YUV word 928 may be used to lookup corresponding high and low RGB values in RGB high table 932 and RGB low table 934, respectively. The high RGB values and the low RGB values are then added to obtain final RGB value 940.

While this invention has been described in terms of several preferred embodiments, there are alterations, permutations, and equivalents which fall within the scope of this invention. It should also be noted that there are many alternative ways of implementing the methods and apparatuses of the present invention. By way of example, encoding and decoding methods have been described in terms of a current frame and a previous frame. However, it should be appreciated that the frames may, alternatively, be a current frame and a subsequent frame without departing from the spirit or the scope of the present invention.

In addition, although the motion estimation process has been described in terms of analyzing both blocks and macroblocks, the motion estimation process may be applied to blocks alone and to macroblocks alone. For example, the steps of adaptively compressing a block and performing an intra compression of a macroblock may both be performed on a block, or, alternatively, both may be performed on a macroblock.

Further, the steps associated with encoding a block using a motion estimation process may be reordered, and steps may be added and deleted without departing from the spirit or the scope of the present invention. In particular, the step of determining the type of compression used to compress the block may be ii eliminated, if only one type of compression is used. It is therefore intended that the following appended claims be interpreted as including all such alterations, permutations, and equivalents as fall within the true spirit and scope of the present invention.

What is claimed is:

1. A method for color space conversion, comprising:
   partitioning components of a YUV color space value to designate high bits and low bits of each component;
   combining the high bits of each component to form one or more high YUV indexes in a high YUV table;
   combining the low bits of each component to form one or more low YUV indexes in a low YUV table;
   converting the one or more high YUV indexes into corresponding one or more high RGB values of a high RGB table;
   converting the one or more low YUV indexes into corresponding one or more low RGB values of a low RGB table; and
   combining the one or more high RGB values with the one or more low RGB values to generate an RGB color space value.

2. A method as recited in claim 1, wherein partitioning the components includes:
   partitioning a Y-component of the YUV color space value into high Y-bits and low Y-bits;
   partitioning a U-component of the YUV color space value into high U-bits and low U-bits; and
   partitioning a V-component of the YUV color space value into high V-bits and low V-bits.

3. A method as recited in claim 1, wherein:
   the one or more high RGB values are each generated as high R-bits, high G-bits, and high B-bits in the high RGB table; and
   the one or more low RGB values are each generated as low R-bits, low G-bits, and low B-bits in the low RGB table.

4. A method as recited in claim 1, wherein combining the one or more high RGB values with the one or more low RGB values includes:
   combining high R-bits with low R-bits to form an R-component of the RGB color space value;
   combining high G-bits with low G-bits to form a G-component of the RGB color space value; and
   combining high B-bits with low B-Bits to form a B-component of the RGB color space value.

5. A method as recited in claim 1, wherein:
   the one or more high RGB values are each generated as high R-bits, high G-bits, and high B-bits in the high RGB table;
   the one or more low RGB values are each generated as low R-bits, low G-bits, and low B-bits in the low RGB table; and
   combining the one or more high RGB values with the one or more low RGB values includes:
   combining the high R-bits with the low R-bits to form an R-component of the RGB color space value;
   combining the high G-bits with the low G-bits to form a G-component of the RGB color space value; and
   combining the high B-bits with the low B-Bits to form a B-component of the RGB color space value.

6. A method as recited in claim 5, further comprising clipping the high R-bits, the high G-bits, and the high B-bits in the high RGB table to avoid bit overflow when said combining the one or more high RGB values with the one or more low RGB values.

7. A method as recited in claim 1, further comprising:
   dithering the one or more high YUV indexes in the high YUV table; and
   dithering the one or more low YUV indexes in the low YUV table.

8. A method as recited in claim 7, further comprising:
   clipping the one or more high YUV indexes in the high YUV table; and
   clipping the one or more low YUV indexes in the low YUV table.

9. A method as recited in claim 1, further comprising clipping the one or more high RGB values in the high RGB table to avoid bit overflow when said combining the one or more high RGB values with the one or more low RGB values.

10. A system, comprising:
    a memory component configured to maintain a high YUV table, a low YUV table, a high RGB table, and a low RGB table;
    a color space conversion application configured to:
    partition components of a YUV color space value to designate high bits and low bits of each component;
    combine the high bits of each component to form one or more high YUV indexes in the high YUV table;
    combine the low bits of each component to form one or more low YL indexes in the low YUV table;
    convert the one or more high YUV indexes into corresponding one or more high RGB values of the high RGB table;
    convert the one or more low YUV indexes into corresponding one or more low RGB values of the low RGB table; and
    combine the one or more high RGB values with the one or more low RGB values to generate an RGB color space value.

11. A system as recited in claim 10, wherein the color space conversion application is further configured to:
    partition a Y-component of the YUV color space value into high Y-bits and low Y-bits;
    partition a U-component of the YUV color space value into high U-bits and low U-bits; and
    partition a V-component of the YUV color space value into high V-bits and low V-bits.

12. A system as recited in claim 10, wherein the color space conversion application is further configured to:

generate the one or more high RGB values as high R-bits, high G-bits, and high B-bits in the high RGB table; and generate the one or more low RGB values as low R-bits, low G-bits, and low B-bits in the low RGB table.

13. A system as recited in claim 10, wherein the color space conversion application is further configured to:

combine high R-bits with low R-bits to form an R-component of the RGB color space value;

combine high G-bits with low G-bits to form a G-component of the RGB color space value; and combine high B-bits with low B-Bits to form a B-component of the RGB color space value.

14. A system as recited in claim 10, wherein the color space conversion application is further configured to:

generate the one or more high RGB values as high R-bits, high G-bits, and high B-bits in the high RGB table;

generate the one or more low RGB values as low R-bits, low G-bits, and low B-bits in the low RGB table;

combine the high R-bits with the low R-bits to form an R-component of the RGB color space value;

combine the high G-bits with the low G-bits to form a G-component of the RGB color space value; and combine the high B-bits with the low B-Bits to form a B-component of the RGB color space value.

15. A system as recited in claim 14, wherein the color space conversion application is further configured to clip the high R-bits, the high G-bits, and the high B-bits in the high RGB table to avoid bit overflow when the one or more high RGB values are combined with the one or more low RGB values.

16. A system as recited in claim 10, wherein the color space conversion application is further configured to:

dither the one or more high YUV indexes in the high YUV table; and dither the one or more low YUV indexes in the low YUV table.

17. A system as recited in claim 16, wherein the color space conversion application is further configured to:

clip the one or more high YUV indexes in the high YUV table; and clip the one or more low YUV indexes in the low YUV table.

18. A system as recited in claim 10, wherein the color space conversion application is further configured to clip the one or more high RGB values in the high RGB table to avoid bit overflow when the one or more high RGB values are combined with the one or more low RGB values.

19. One or more computer-readable media comprising computer executable instructions that, when executed, implement a color space conversion comprising:

partitioning components of a YUV color space value to designate high bits and low bits of each component;

combining the high bits of each component to form one or more high YUV indexes in a high YUV table;

combining the low bits of each component to form one or more low YUV indexes in a low YUV table;

converting the one or more high YUV indexes into corresponding one or more high RGB values of a high RGB table;

converting the one or more low YUV indexes into corresponding one or more low RGB values of a low RGB table; and combining the one or more high RGB values with the one or more low RGB values to generate an RGB color space value.

20. One or more computer-readable media as recited in claim 19, further comprising computer executable instructions that, when executed, further implement the color space conversion by:

partitioning a Y-component of the YUV color space value into high Y-bits and low Y-bits;

partitioning a U-component of the YUV color space value into high U-bits and low U-bits; and partitioning a V-component of the YUV color space value into high V-bits and low V-bits.

21. One or more computer-readable media as recited in claim 19, further comprising computer executable instructions that, when executed, further implement the color space conversion by:

generating the one or more high RGB values as high R-bits, high G-bits, and high B-bits in the high RGB table; and generating the one or more low RGB values as low R-bits, low G-bits, and low B-bits in the low RGB table.

22. One or more computer-readable media as recited in claim 19, further comprising computer executable instructions that, when executed, further implement the color space conversion by:

combining high R-bits with low R-bits to form an R-component of the RGB color space value;

combining high G-bits with low G-bits to form a G-component of the RGB color space value; and combining high B-bits with low B-Bits to form a B-component of the RGB color space value.

23. One or more computer-readable media as recited in claim 19, further comprising computer executable instructions that, when executed, further implement the color space conversion by:

dithering the one or more high YUV indexes in the high YUV table; and dithering the one or more low YUV indexes in the low YUV table.

24. One or more computer-readable media as recited in claim 19, further comprising computer executable instructions that, when executed, further implement the color space conversion by clipping high R-bits, high G-bits, and high B-bits in the high RGB table to avoid bit overflow when said combining the one or more high RGB values with the one or more low RGB values.

25. A method for decoding a bit stream, comprising:

receiving the bit stream of data bits;

parsing a group of the data bits into a first stage table of first stage bits and at least a second stage table of second stage bits;

decoding the group of the data bits to determine a value corresponding to the group of the data bits, such that:

in an event that the value corresponding to the group of data bits is represented by the first stage bits, flushing one or more of the first stage bits that represent the value; and in an event that the value corresponding to the group of data bits is represented by the first stage bits and the second stage bits, flushing the first stage bits and one or more of the second stage bits that, in combination, represent the value.

26. A method for decoding a bit stream as recited in claim 25, wherein parsing includes parsing the group of data bits into N-stage tables of N-stage bits.

27. A method for decoding a bit stream as recited in claim 25, wherein:
   parsing includes parsing the group of data bits into N-stage tables of N-stage bits; and
   decoding includes flushing the first stage bits, the second stage bits, and one or more of the N-stage bits that, in combination, represent the value.

28. One or more computer-readable media comprising computer executable instructions that, when executed, implement the method as recited in claim 25.

29. One or more computer-readable media comprising computer executable instructions that, when executed, implement the method as recited in claim 27.

30. A system, comprising:
   a memory component configured to maintain N-stage tables of N-stage bits;
   a table-based N-stage Huffman decoder configured to:
      receive a bit stream of data bits;
      parse a group of the data bits into a first stage table of first stage bits and at least a second stage table of second stage bits;
      decode the group of the data bits to determine a value corresponding to the group of the data bits, such that:
         in an event that the value corresponding to the group of data bits is represented by the first stage bits, the decoder is further
         configured to flush one or more of the first stage bits that represent the value; and
         in an event that the value corresponding to the group of data bits is represented by the first stage bits and the second stage bits, the decoder is further configured to flush the first stage bits and one or more of the second stage bits that, in combination, represent the value.

31. A system as recited in claim 30, wherein the table-based N-stage Huffman decoder is further configured to parse the group of the data bits into the N-stage tables of the N-stage bits.

32. A system as recited in claim 30, wherein the table-based N-stage Huffman decoder is further configured to:
   parse the group of data bits into the N-stage tables of the N-stage bits; and
   flush the first stage bits, the second stage bits, and one or more of the N-stage bits that, in combination, represent the value.

* * * * *

UNITED STATES PATENT AND TRADEMARK OFFICE
CERTIFICATE OF CORRECTION

PATENT NO.    : 6,639,945 B2
DATED         : October 28, 2003
INVENTOR(S)   : Peter N. Graffagnino It is certified that error appears in the above-identified patent and that said Letters Patent is hereby corrected as shown below:

Column 11,
Line 30, delete "to" between "as" and "well".

Column 20,
Line 45, replace "YIN" with -- YUV --.

Column 22,
Line 47, replace "YL" with -- YUV --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.      : 6,639,945 B2
DATED           : October 28, 2003
INVENTOR(S)     : Peter N. Graffagnino It is certified that error appears in the above-identified patent and that said Letters Patent is hereby corrected as shown below:

<u>Title page,</u>
Item [75], Inventors, replace "Peter N. Graffagnino" with -- Chaddha et al. --

Signed and Sealed this

Fifth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,639,945 B2
DATED : October 28, 2003
INVENTOR(S) : Navin Chaddha et al.

It is certified that error appears in the above-identified patent and that said Letters Patent is hereby corrected as shown below:

Column 11,
Line 30, delete "to" between "as" and "well".

Column 20,
Line 45, replace "YIN" with -- YUV --.

Column 22,
Line 47, replace "YL" with -- YUV --.

This certificate supersedes Certificate of Correction issued March 23, 2004.

Signed and Sealed this

Twenty-second Day of February, 2005

JON W. DUDAS
*Director of the United States Patent and Trademark Office*